US010715678B2

(12) United States Patent
Kawamura et al.

(10) Patent No.: US 10,715,678 B2
(45) Date of Patent: Jul. 14, 2020

(54) MOBILE TERMINAL, EVENT INFORMATION DISPLAY METHOD, NON-TRANSITORY COMPUTER-READABLE RECORDING MEDIUM STORING EVENT INFORMATION DISPLAY PROGRAM, AND INTERCOM SYSTEM

(71) Applicant: Panasonic Intellectual Property Management Co., Ltd., Osaka (JP)

(72) Inventors: Tsuyoshi Kawamura, Fukuoka (JP); Yoshihiro Shirakawa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/374,383

(22) Filed: Apr. 3, 2019

(65) Prior Publication Data

US 2019/0230226 A1 Jul. 25, 2019

(30) Foreign Application Priority Data

Apr. 6, 2018 (JP) .................................. 2018-073985
Apr. 6, 2018 (JP) .................................. 2018-073991
(Continued)

(51) Int. Cl.
*H04M 11/02* (2006.01)
*H04M 1/02* (2006.01)
(Continued)

(52) U.S. Cl.
CPC ..... *H04M 11/025* (2013.01); *G08B 13/19682* (2013.01); *G08B 13/19684* (2013.01);
(Continued)

(58) Field of Classification Search
CPC ...... G04M 11/02; G04M 1/02; G04M 1/0291; G04M 11/025; G08B 13/196;
(Continued)

(56) References Cited

U.S. PATENT DOCUMENTS

2008/0069326 A1\* 3/2008 Chang .................. H04M 11/025
379/167.11
2014/0221049 A1\* 8/2014 Kim ........................ H04M 1/56
455/566
(Continued)

FOREIGN PATENT DOCUMENTS

JP 8-274891 A 10/1996
JP 2003-333199 A 11/2003
(Continued)

OTHER PUBLICATIONS

Communication pursuant to Article 94(3) EPC, dated Jul. 5, 2019, for European Application No. 19167288.0-1216, 5 pages.
(Continued)

*Primary Examiner* — Melur Ramakrishnaiah
(74) *Attorney, Agent, or Firm* — Seed IP Law Group LLP

(57) ABSTRACT

Provided is a mobile terminal that communicates with a server that performs call control between an intercom disposed in a lobby of an apartment building and an indoor monitor. The server stores event information transmitted from the intercom, the indoor monitor, or a terminal apparatus connected to the server. The mobile terminal includes: a receiver that receives the event information from the server; and a display section that displays the event information in chronological order from an upper side to a lower side of a display apparatus and that scroll displays the event information.

20 Claims, 16 Drawing Sheets

(30) Foreign Application Priority Data

Apr. 6, 2018 (JP) .................................. 2018-073998
Apr. 18, 2018 (JP) .................................. 2018-079961

(51) Int. Cl.
*G08B 13/196* (2006.01)
*H04L 12/28* (2006.01)

(52) U.S. Cl.
CPC .......... *H04L 12/28* (2013.01); *H04L 12/2836* (2013.01); *H04M 1/0291* (2013.01)

(58) Field of Classification Search
CPC ........ G08B 13/19682; G08B 13/19684; H04L 12/28; H04L 12/2836
USPC .............................. 379/102; 348/14.01–14.16
See application file for complete search history.

(56) References Cited

U.S. PATENT DOCUMENTS

| | | | |
|---|---|---|---|
| 2015/0035987 A1 | 2/2015 | Fernandez | |
| 2016/0164694 A1* | 6/2016 | Hyun | H04L 12/12 348/14.08 |
| 2016/0255494 A1* | 9/2016 | Shin | H04L 51/16 455/415 |
| 2016/0381327 A1* | 12/2016 | Rolf | H04N 7/186 348/14.07 |
| 2017/0093791 A1 | 3/2017 | Gwock et al. | |
| 2018/0018081 A1* | 1/2018 | Dattilo-Green | H04L 67/025 |

FOREIGN PATENT DOCUMENTS

| | | |
|---|---|---|
| JP | 2007-288288 A | 11/2007 |
| JP | 2018/030483 A1 | 2/2008 |
| JP | 2010-21661 A | 1/2010 |
| JP | 2010-74698 A | 4/2010 |
| JP | 2010-81217 A | 4/2010 |
| JP | 2010-200022 A | 9/2010 |
| JP | 2011-135221 A | 7/2011 |
| JP | 2014-11702 A | 1/2014 |
| JP | 2015-211349 A | 11/2015 |
| JP | 2017-63421 A | 3/2017 |
| JP | 2017-212691 A | 11/2017 |
| JP | 2018-18170 A | 2/2018 |
| JP | 2018-56960 A | 4/2018 |

OTHER PUBLICATIONS

European Search Report, dated Jun. 17, 2019, for European Application No. 19167288.0-1216, 5 pages.
Technisches De et al., "Benutzerhandbuch App Intercall Remove Vip Für Geräte," Jan. 1, 2014, XP055591741, retrieved May 24, 2019, 32 pages. (with English translation).
Panasonic, "Digital 4K Video Camera HC-WXF 990M Instruction Manual," URL <https://panasonic.jp/dvc/p-db/HC-WXF990M_manualdl.html>, 2015, 269 pages. (With partial English manual translation).
The Extended European Search Report, dated May 8, 2020, for the related European Patent Application No. 20155323.7, 10 pages.

* cited by examiner

MOBILE TERMINAL, EVENT INFORMATION DISPLAY METHOD, NON-TRANSITORY COMPUTER-READABLE RECORDING MEDIUM STORING EVENT INFORMATION DISPLAY PROGRAM, AND INTERCOM SYSTEM

CROSS REFERENCE TO RELATED APPLICATIONS

This application is entitled to and claims the benefit of Japanese Patent Application No. 2018-073985, filed on Apr. 6, 2018, Japanese Patent Application No. 2018-073991, filed on Apr. 6, 2018, Japanese Patent Application No. 2018-073998, filed on Apr. 6, 2018, and Japanese Patent Application No. 2018-079961, filed on Apr. 18, 2018, the disclosures of which including the specifications, drawings and abstracts are incorporated herein by reference in their entirety.

TECHNICAL FIELD

The present disclosure relates to a mobile terminal, an event information display method, a non-transitory computer-readable recording medium storing an event information display program, and an intercom system.

BACKGROUND ART

There has been a widely used intercom system capable of confirming a visitor to an entrance from an indoor parent device in a room via an entrance child device located in the vicinity of an entrance door. In recent years, there is a technique attracting much attention, in which a communication function is provided in an indoor parent device and confirmation of visitors is performed from a mobile terminal such as a smartphone that can be carried by a person.

For example, PTL 1 discloses an intercom system for connecting an entrance child device with a mobile terminal via a parent device in response to calling operation by a visitor via the entrance child device and thereafter responding to the visitor from the mobile terminal.

CITATION LIST

Patent Literature

PTL 1
Japanese Patent Application Laid-Open No. 2011-135221

SUMMARY OF INVENTION

Technical Problem

Meanwhile, some of apartment buildings such as condominiums have their receptionist disposed in a lobby in the building. In such an apartment building, a visitor asks the receptionist to call a resident of a room the visitor wishes to visit. For example, the receptionist calls an indoor monitor located in the room from a telephone in the lobby to call the resident of the room and notifies the resident of the visitor.

The conventional system, however, has not been configured to receive an image of the visitor on a mobile terminal of the resident of the apartment building.

One non-limiting and exemplary embodiment of the present disclosure facilitates providing a mobile terminal and a communication method capable of receiving a call from a telephone disposed in a lobby of an apartment building and thereafter receiving an image of a visitor.

Solution to Problem

A mobile terminal according to one aspect of the present disclosure is a mobile terminal that communicates with a server that performs call control between an intercom disposed in a lobby of an apartment building and an indoor monitor, the server storing event information transmitted from the intercom, the indoor monitor, or a terminal apparatus which is connected to the server, the mobile terminal including: a receiver that receives the event information from the server; and a display section that displays the event information in chronological order from an upper side to a lower side of a display apparatus and that scroll-displays the event information.

An event information display method according to one aspect of the present disclosure is an event information display method for a mobile terminal that communicates with a server that performs call control between an intercom disposed in a lobby of an apartment building and an indoor monitor, the server storing event information transmitted from the intercom, the indoor monitor, or a terminal apparatus which is connected to the server, the event information display method including: receiving the event information from the server; and displaying the event information in chronological order from an upper side to a lower side of a display apparatus and scroll-displaying the event information.

A non-transitory computer-readable recording medium storing an event information display program according to one aspect of the present disclosure is an event information display program for a mobile terminal that communicates with a server that performs call control between a telephone disposed in a lobby of an apartment building and an indoor monitor, the server storing event information transmitted from the intercom, the indoor monitor, or a terminal apparatus connected to the server, the program causing a computer to execute processing including: receiving the event information from the server; and displaying the event information in chronological order from an upper side to a lower side of a display apparatus and scroll-displaying the event information.

An intercom system according to one aspect of the present disclosure includes: a telephone disposed in a lobby of an apartment building; an indoor monitor disposed in a room of the apartment building; a server that performs call control between the telephone and the indoor monitor; and a mobile terminal that communicates with the server, the server storing event information transmitted from the intercom, the indoor monitor, or a terminal apparatus connected to the server, in which the mobile terminal includes: a receiver that receives the event information from the server; and a display section that displays the event information in chronological order from an upper side to a lower side of a display apparatus and that scroll displays the event information.

These general and specific aspects may be implemented by using a system, a method, an integrated circuit, a computer program, or a recording medium, or by using any combination of systems, apparatuses, methods, integrated circuits, computer programs, or recording media.

According to one aspect of the present disclosure, a call from a telephone disposed in a lobby of an apartment building can be handled and an image of a visitor can be received.

Additional benefits and advantages of an embodiment of the present disclosure will be apparent from the Description and Drawings. The benefits and/or advantages may be individually obtained by the various embodiments and features of the Description and Drawings, which need not all be provided in order to obtain one or more of such benefits and/or advantages.

DESCRIPTION OF EMBODIMENTS

Hereinafter, embodiments of the present invention will be described in detail with reference to the drawings as appropriate. However, excessively detailed description will be omitted in some cases. For example, detailed descriptions of well-known matters and redundant explanation on substantially an identical configuration will be omitted in some cases. This is to avoid the unnecessary redundancy of the following description and to facilitate understanding by those skilled in the art.

Note that the accompanying drawings and the following description are provided to enable those skilled in the art to fully understand the present disclosure, and are not intended to limit the claimed subject matter by these drawings or descriptions.

Embodiment 1

Figure 1:
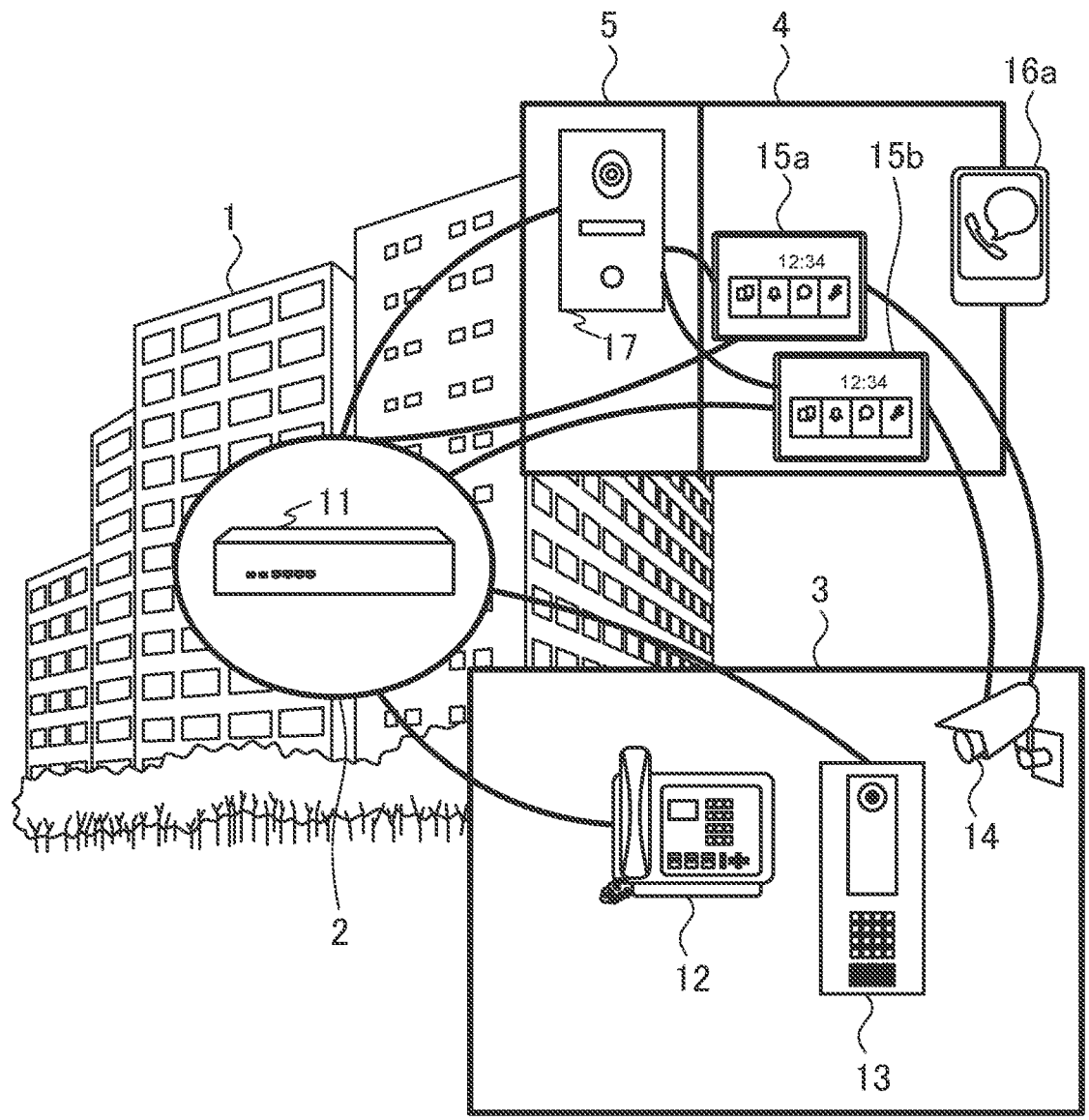
FIG. 1 is a diagram illustrating a configuration example of an intercom system according to Embodiment 1.

FIG. 1 is a diagram illustrating a configuration example of an intercom system according to Embodiment 1. The intercom system is applied to apartment building 1, such as condominiums and apartment houses, for example. Apartment building 1 includes control room 2, lobby 3, room 4, and entrance 5 of room 4, for example.

In control room 2, server 11 is disposed. There are telephone 12, lobby intercom 13, and camera 14, disposed in lobby 3. In room 4, indoor monitors 15a and 15b are disposed. Mobile terminal 16a is a mobile terminal possessed by a resident of room 4. At entrance 5 of room 4, entrance intercom 17 is disposed.

Server 11 is a session initiation protocol (SIP) server, for example. Server 11 performs call control between devices (excluding camera 14) disposed in lobby 3 and devices (including mobile terminal 16a) disposed in room 4.

In apartment building 1, there is a case where a receptionist is disposed in lobby 3. In such apartment building 1, a visitor asks the receptionist to call a resident of room 4 the visitor wishes to visit. For example, the receptionist uses telephone 12 to call indoor monitors 15a and 15b and mobile terminal 16a of room 4, and calls the resident of room 4. Telephone 12 is a SIP phone, for example. In consideration of general cases where the receptionist and the resident of room 4 talk to each other, telephone 12 is a handset-type telephone capable of suppressing leakage of voice of the resident to the outside, rather than a speaker phone-type telephone.

Lobby intercom 13 includes a call function and a camera, for example. In response to an input of identification information (for example, a room number or an extension number of room 4) for identifying room 4, lobby intercom 13 is capable of calling indoor monitors 15a and 15b or mobile terminal 16a of room 4, for example. Subsequently, lobby intercom 13 can talk with any of indoor monitors 15a and 15b or mobile terminal 16a that has received the call. Moreover, lobby intercom 13 uses its own camera to capture an image of a person standing in front of lobby intercom 13, for example, and transmits a captured image (for example, a moving image) to any of indoor monitors 15a and 15b, or mobile terminal 16a of room 4.

Camera 14 is, for example, a monitoring camera for capturing a state in lobby 3. Camera 14 is an Internet Protocol (IP) camera without a voice call function, for example. In response to a request from any of indoor monitors 15a and 15b or mobile terminal 16a, camera 14 transmits the captured image to any of indoor monitors 15a and 15b or mobile terminal 16a.

Indoor monitors 15a and 15b are capable of receiving a call from telephone 12 or lobby intercom 13 disposed in lobby 3 and capable of talking with telephone 12 or lobby intercom 13. In addition, indoor monitors 15a and 15b are capable of receiving a call from entrance intercom 17 disposed in entrance 5 and capable of talking with entrance intercom 17.

Each of indoor monitors 15a and 15b has a display. The displays of indoor monitors 15a and 15b display images captured by lobby intercom 13, images captured by camera 14, or images captured by entrance intercom 17.

For example, when indoor monitors 15a and 15b are talking with telephone 12, images captured by camera 14 are displayed on the displays of indoor monitors 15a and 15b. Furthermore, when indoor monitors 15a and 15b are talking with lobby intercom 13, images captured by the camera of lobby intercom 13 are displayed on the displays of indoor monitors 15a and 15b. The displays of indoor monitors 15a and 15b display images captured by the camera of entrance intercom 17 when indoor monitors 15a and 15b are talking with entrance intercom 17.

Mobile terminal 16a is a mobile terminal possessed by the resident of room 4. Mobile terminal 16a is a smartphone, for example. Mobile terminal 16a is capable of receiving a call from telephone 12, lobby intercom 13, or entrance intercom 17 and capable of talking with telephone 12, lobby intercom 13, or entrance intercom 17, via a network including a cellular phone network and the Internet. In other words, mobile terminal 16a is capable of talking with telephone 12, lobby intercom 13, or entrance intercom 17 even when mobile terminal 16a is outside room 4 in addition to inside room 4.

Mobile terminal 16a includes a display. The display of mobile terminal 16a displays an image captured by lobby intercom 13, an image captured by camera 14, or an image captured by entrance intercom 17.

For example, when mobile terminal 16a and telephone 12 are talking with each other, an image captured by camera 14 is displayed on the display of mobile terminal 16a. Furthermore, when mobile terminal 16a and lobby intercom 13 are talking with each other, an image captured by the camera of lobby intercom 13 is displayed on the display of mobile terminal 16a. Furthermore, when mobile terminal 16a and entrance intercom 17 are talking with each other, an image captured by the camera of entrance intercom 17 is displayed on the display of mobile terminal 16a.

Note that while FIG. 1 illustrates two indoor monitors 15a and 15b, the number of monitors may be one, or three or more.

Figure 2:
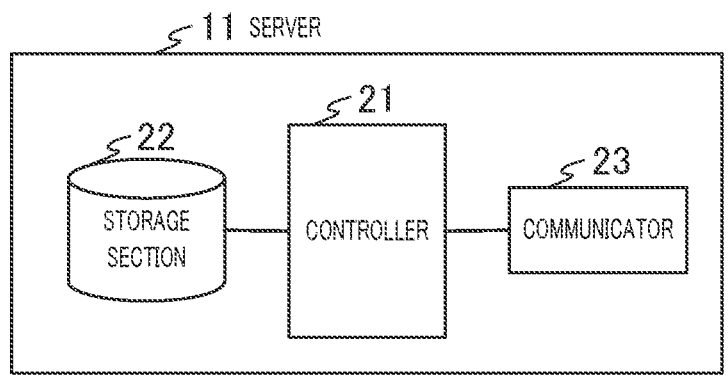
FIG. 2 is a diagram illustrating a block configuration example of a server.

FIG. 2 is a diagram illustrating a block configuration example of server 11. As illustrated in FIG. 2, server 11 has controller 21, storage section 22, and communicator 23.

Controller 21 performs overall control of server 11. Controller 21 may be constituted by a central processing unit (CPU), for example.

Storage section 22 stores a program used for operation of controller 21. Storage section 22 stores data used by controller 21 to perform calculation processing and to control each of sections connected to controller 21. Storage section 22 may be configured with a storage apparatus such as a random access memory (RAM), a read only memory (ROM), a flash memory, and a hard disk drive (HDD).

Communicator 23 communicates with telephone 12, lobby intercom 13, indoor monitors 15a and 15b, and entrance intercom 17 via a network such as a local area network (LAN) installed in apartment building 1. Furthermore, communicator 23 communicates with mobile terminal 16a via a network including a cellular phone network and the Internet.

Figure 3:
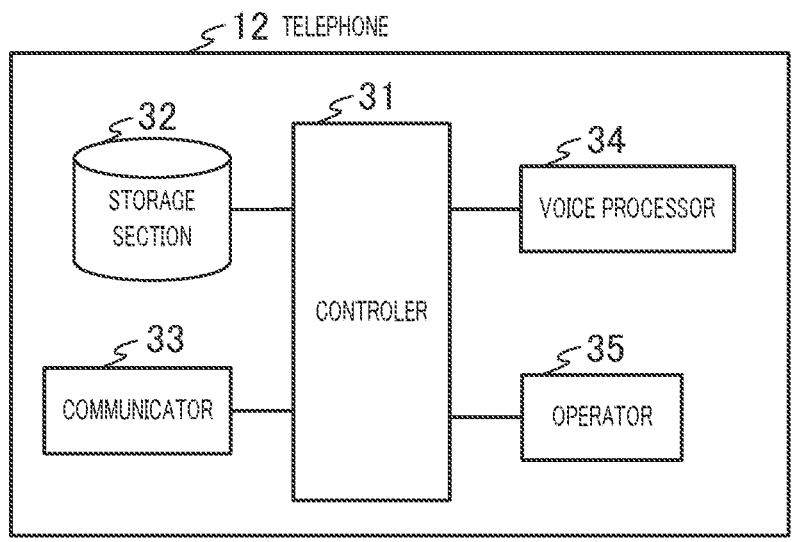
FIG. 3 is a diagram illustrating a block configuration example of a telephone.

FIG. 3 is a diagram illustrating a block configuration example of telephone 12. As illustrated in FIG. 3, telephone 12 includes controller 31, storage section 32, communicator 33, voice processor 34, and operator 35.

Controller 31 performs overall control of telephone 12. Controller 31 may be constituted by a CPU, for example.

Storage section 32 stores a program used for operation of controller 31. Storage section 32 stores data used by controller 31 to perform calculation processing and to control each of sections connected to controller 31. Storage section 32 may be configured with a storage apparatus such as a RAM, a ROM, a flash memory, and an HDD.

Communicator 33 communicates with server 11 via a network such as a LAN installed in apartment building 1.

Voice processor 34 converts analog voice data output from a microphone (not illustrated) built in a handset of telephone 12 into digital voice data, for example, and outputs the converted data to controller 31. Voice processor 34 converts the digital voice data output from controller 31, into analog voice data, for example, and outputs the converted data to a speaker (not illustrated) built in the handset of telephone 12.

Operator 35 receives operation of the receptionist of lobby 3, for example. Operator 35 outputs information corresponding to the received operation to controller 31. Operator 35 is a push button for receiving an input of a telephone number, for example.

Figure 4:
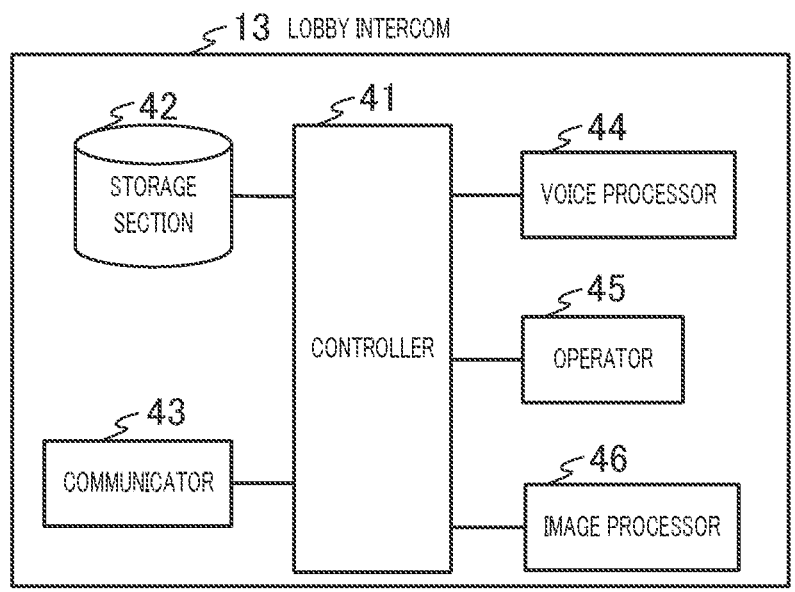
FIG. 4 is a diagram illustrating a block configuration example of a lobby intercom.

FIG. 4 is a diagram illustrating a block configuration example of lobby intercom 13. As illustrated in FIG. 4, lobby intercom 13 includes controller 41, storage section 42, communicator 43, voice processor 44, operator 45, and image processor 46.

Controller 41 performs overall control of lobby intercom 13. Controller 41 may be constituted by a CPU, for example.

Storage section 42 stores a program used for operation of controller 41. Storage section 42 stores data used by controller 41 to perform calculation processing and to control each of sections connected to controller 41. Storage section 42 may be configured with a storage apparatus such as a RAM, a ROM, a flash memory, and an HDD.

Communicator 43 communicates with server 11 and mobile terminal 16a via a network such as LAN installed in apartment building 1.

Voice processor 44 converts analog voice data output from a microphone (not illustrated) built in lobby intercom 13 into digital voice data, for example, and outputs the converted data to controller 41. Furthermore, voice processor 44 converts the digital voice data output from controller 41, for example, into analog voice data and outputs the converted data to a speaker (not illustrated) built in lobby intercom 13.

Operator 45 receives operation of a visitor, for example. Operator 45 outputs information corresponding to the received operation to controller 41. Operator 45 is a push button for receiving an input of a telephone number, for example.

Image processor 46 converts analog video image data captured by an image sensor (not illustrated) included in lobby intercom 13 into a digital signal, for example, and outputs the converted signal to controller 41. Image processor 46 may perform predetermined image processing such as image quality adjustment, noise cancellation, image compression processing, or the like on the analog video image signal or the digital video image data.

Figure 5:
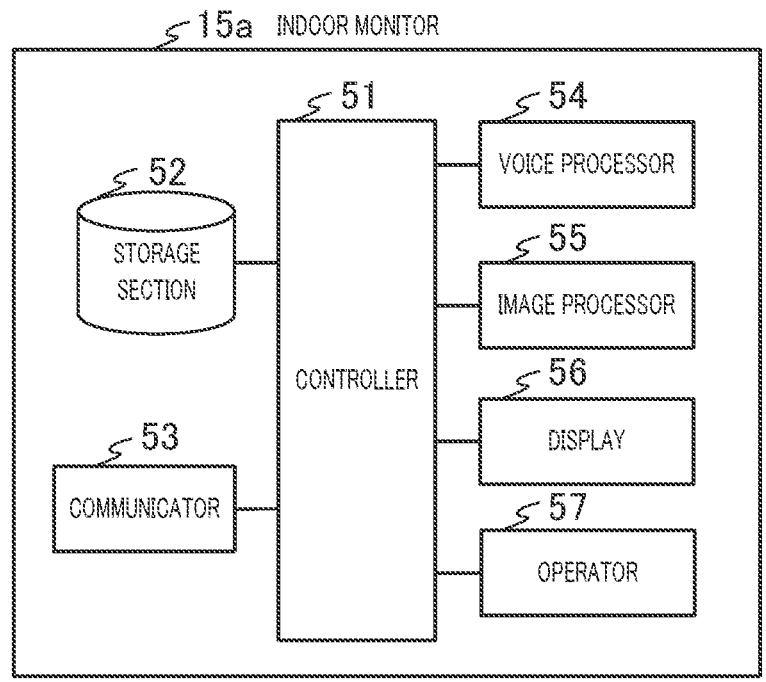
FIG. 5 is a diagram illustrating a block configuration example of an indoor monitor.

FIG. 5 is a diagram illustrating a block configuration example of indoor monitor 15a. As illustrated in FIG. 5, indoor monitor 15a has controller 51, storage section 52, communicator 53, voice processor 54, image processor 55, display 56, and operator 57. Note that indoor monitor 15b also has the block configuration illustrated in FIG. 5, and thus, description thereof will be omitted.

Controller 51 performs overall control of indoor monitor 15a. Controller 51 may be constituted by a CPU, for example.

Storage section 52 stores a program used for operation of controller 51. Storage section 52 stores data used by controller 51 to perform calculation processing and to control each of sections connected to controller 51. Storage section 52 may be configured with a storage apparatus such as a RAM, a ROM, a flash memory, and an HDD.

Communicator 53 communicates with server 11 via a network such as LAN installed in apartment building 1. Furthermore, communicator 53 communicates with camera 14 via a network such as a LAN installed in apartment building 1. Furthermore, the communicator 53 communicates with entrance intercom 17 via a network such as a LAN installed in apartment building 1.

Voice processor 54 converts analog voice data output from a microphone (not illustrated) built in indoor monitor 15a into digital voice data, for example, and outputs the converted data to controller 51. Voice processor 54 converts the digital voice data output from controller 51, into analog voice data, for example, and outputs the converted data to a speaker (not illustrated) built in indoor monitor 15a.

Image processor 55 converts analog video image data captured by an image sensor (not illustrated) included in indoor monitor 15a into a digital signal, for example, and outputs the converted signal to controller 51. Image processor 55 may perform predetermined image processing such as image quality adjustment, noise cancellation, and image compression processing on the analog video image signal or the digital video image data.

Display 56 displays a video image on the basis of the digital video image data output from controller 51. Display 56 is a liquid crystal display, for example.

Operator 57 receives operation of a resident of room 4, for example. Operator 57 outputs information corresponding to the received operation to controller 51. Operator 57 is touch screen superimposed on display 56, for example. Operator 57 may be a push button.

Figure 6:
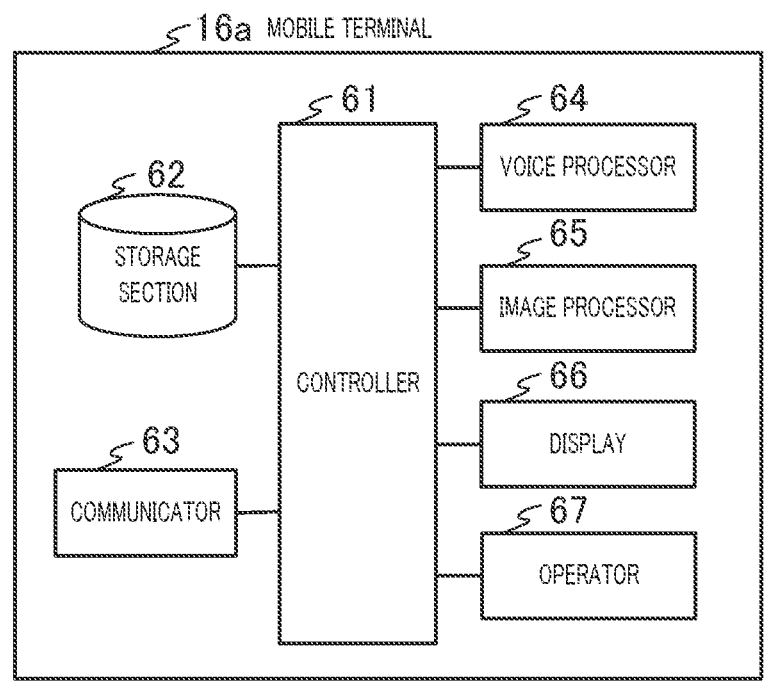
FIG. 6 is a diagram illustrating a block configuration example of a mobile terminal.

FIG. 6 is a diagram illustrating a block configuration example of mobile terminal 16a. As illustrated in FIG. 6, mobile terminal 16a includes controller 61, storage section 62, communicator 63, voice processor 64, image processor 65, display 66, and operator 67.

Controller 61 performs overall control of mobile terminal 16a. Controller 61 may be constituted by a CPU, for example.

Storage section 62 stores a program used for operation of controller 61. Storage section 62 stores data used by controller 61 to perform calculation processing and to control each of sections connected to controller 61. Storage section 62 may be configured with a storage apparatus such as a RAM, a ROM, a flash memory, and an HDD.

Communicator 63 communicates with server 11 disposed in control room 2 of apartment building 1 via a network including a cellular phone network and the Internet, for example. Furthermore, the communicator 63 communicates with camera 14 disposed in lobby 3 via a network including a cellular phone network and the Internet, for example.

Voice processor 64 converts analog voice data output from a microphone (not illustrated) built in mobile terminal 16a into digital voice data, for example, and outputs the converted data to controller 61. Voice processor 64 converts the digital voice data output from controller 61 into analog voice data, for example, and outputs the converted data to a speaker (not illustrated) built in mobile terminal 16a.

Image processor 65 converts analog video image data captured by an image sensor (not illustrated) included in mobile terminal 16a into a digital signal, for example, and outputs the converted signal to controller 61. Image processor 65 may perform predetermined image processing such as image quality adjustment, noise cancellation, and image compression processing on the analog video image signal or the digital video image data.

Display 66 displays a video image on the basis of the digital video image data output from controller 61. Display 66 is a liquid crystal display, for example.

Operator 67 receives operation of an owner of mobile terminal 16a, for example. Operator 67 outputs information corresponding to the received operation to controller 61. Operator 67 is touch screen superimposed on display 66, for example. Operator 67 may be a push button.

The intercom system of FIG. 1 arranges telephone 12 and lobby intercom 13 in lobby 3. However, depending on the type of apartment building 1, telephone 12 alone might be disposed in lobby 3 with no lobby intercom 13 disposed in lobby 3, in some cases. Hereinafter, as Embodiment 1, a case where telephone 12 alone is disposed in lobby 3 with no lobby intercom 13 disposed in lobby 3 will be described.

Figure 7:
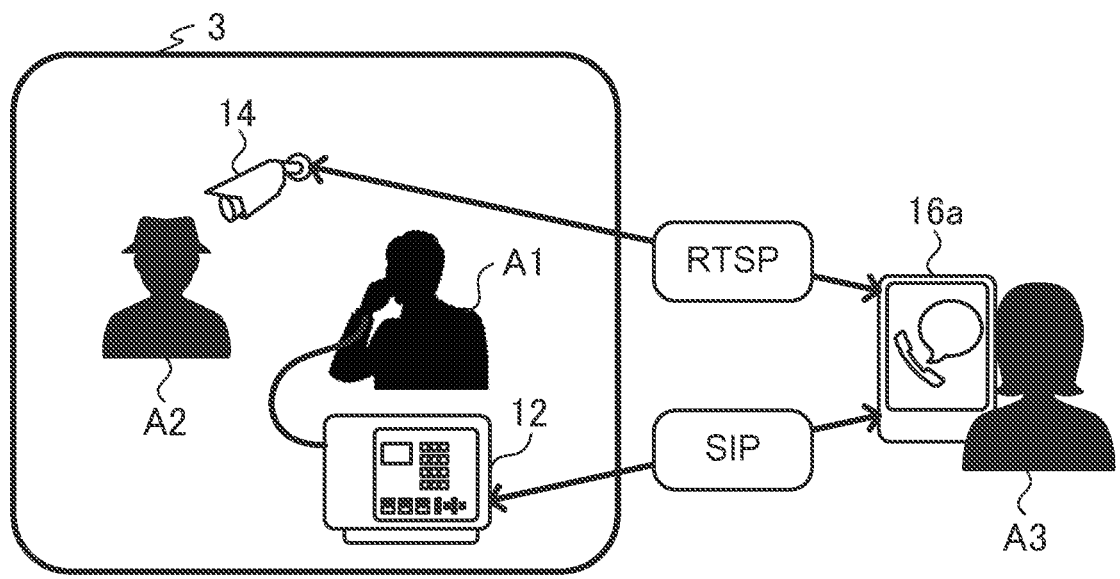
FIG. 7 is a diagram illustrating an example of an intercom system.

FIG. 7 is a diagram illustrating an example of an intercom system. In FIG. 7, the same reference numerals are attached to the same components as those in FIG. 1. FIG. 7 illustrates receptionist A1 of apartment building 1, visitor A2 visiting the resident of room 4, and resident A3 of room 4 who is out of the room. Resident A3 is assumed to be out carrying mobile terminal 16a.

In the intercom system of FIG. 7, lobby intercom 13 equipped with a camera is not disposed in lobby 3. Therefore, in the intercom system of FIG. 7, camera 14 disposed in lobby 3 is used to capture visitor A2.

Visitor A2 tells receptionist A1 about one's visit to resident A3 of room 4. Receptionist A1 uses telephone 12 to makes a phone call to room 4. Calling by telephone 12 is performed for indoor monitors 15a and 15b disposed in room 4 and mobile terminal 16a possessed by resident A3 of room 4 via server 11. As will be described below, calling of mobile terminal 16a by server 11 is performed by using push notification via a push server.

Here is an assumed exemplary case where resident A3 who is out uses mobile terminal 16a to respond to the call from telephone 12 to indoor monitors 15a and 15b and mobile terminal 16a.

Mobile terminal 16a accesses server 11 in response to the response operation of resident A3. Server 11 performs call control between mobile terminal 16a and telephone 12 on the basis of SIP, and establishes a session between mobile terminal 16a and telephone 12. This enables talking between telephone 12 and mobile terminal 16a.

Furthermore, mobile terminal 16a accesses camera 14 without interposing server 11 in response to the response operation of resident A3. Mobile terminal 16a establishes a session with camera 14 on the basis of Real Time Streaming Protocol (RTSP). This session enables mobile terminal 16a to receive from camera 14 the image captured by camera 14 and display the received image on the display.

That is, telephone 12 and mobile terminal 16a establish a session on the basis of the SIP, and talk to each other. In addition, telephone 12 and camera 14 establish a session on the basis of the RTSP, and perform transmission and reception of an image. This enables mobile terminal 16a to perform video calling using telephone 12 and camera 14.

Figure 8:
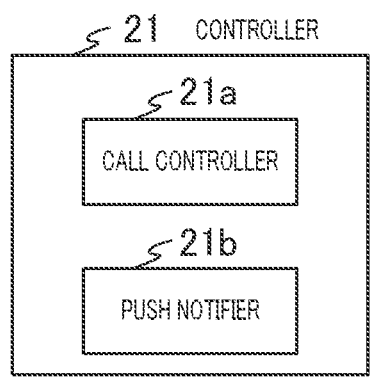
FIG. 8 is a diagram illustrating a block configuration example of a controller of a server.

FIG. 8 is a diagram illustrating a block configuration example of controller 21 of server 11. As illustrated in FIG. 8, controller 21 of server 11 has a call controller 21a and a push notifier 21b.

The call controller 21a performs call control between telephone 12 and mobile terminal 16a on the basis of the SIP. Moreover, call controller 21a performs call control between telephone 12 and indoor monitors 15a and 15b on the basis of the SIP.

In a case where there is a call (INVITE) addressed to indoor monitors 15a and 15b and mobile terminal 16a from telephone 12, the push notifier 21b makes a push notification to mobile terminal 16a. The push notification is made via the push server.

Figure 9:
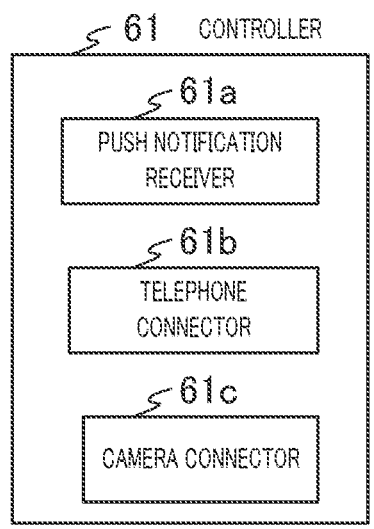
FIG. 9 is a diagram illustrating a block configuration example of a controller of a mobile terminal.

FIG. 9 is a diagram illustrating a block configuration example of controller 61 of mobile terminal 16a. As illustrated in FIG. 9, controller 61 of mobile terminal 16a includes push notification receiver 61a, telephone connector 61b, and camera connector 61c.

The push notification receiver 61a receives the push notification transmitted from server 11. After receiving the push notification, the push notification receiver 61a displays, on a display, information (for example, an icon) indicating that a push notification has been received, for example. Alternatively, push notification receiver 61a notifies the owner of mobile terminal 16a that the push notification has been received by voice.

Telephone connector 61b establishes a session with telephone 12 that has called mobile terminal 16a in accordance with the operation of the owner that has recognized the push notification. For example, when the push notification icon displayed on the display is tapped by the owner, the telephone connector 61b establishes a session with telephone 12. Telephone connector 61b establishes a session with telephone 12 on the basis of the SIP via server 11.

The camera connector 61c accesses camera 14 in accordance with the operation of the owner who has recognized the push notification, and receives the image captured by camera 14. For example, when the icon of the push notification displayed on the display is tapped by the owner, camera connector 61c establishes a session with camera 14 and receives the image captured by camera 14. The camera connector 61c receives an image from camera 14 on the basis of the RTSP.

Figure 10:
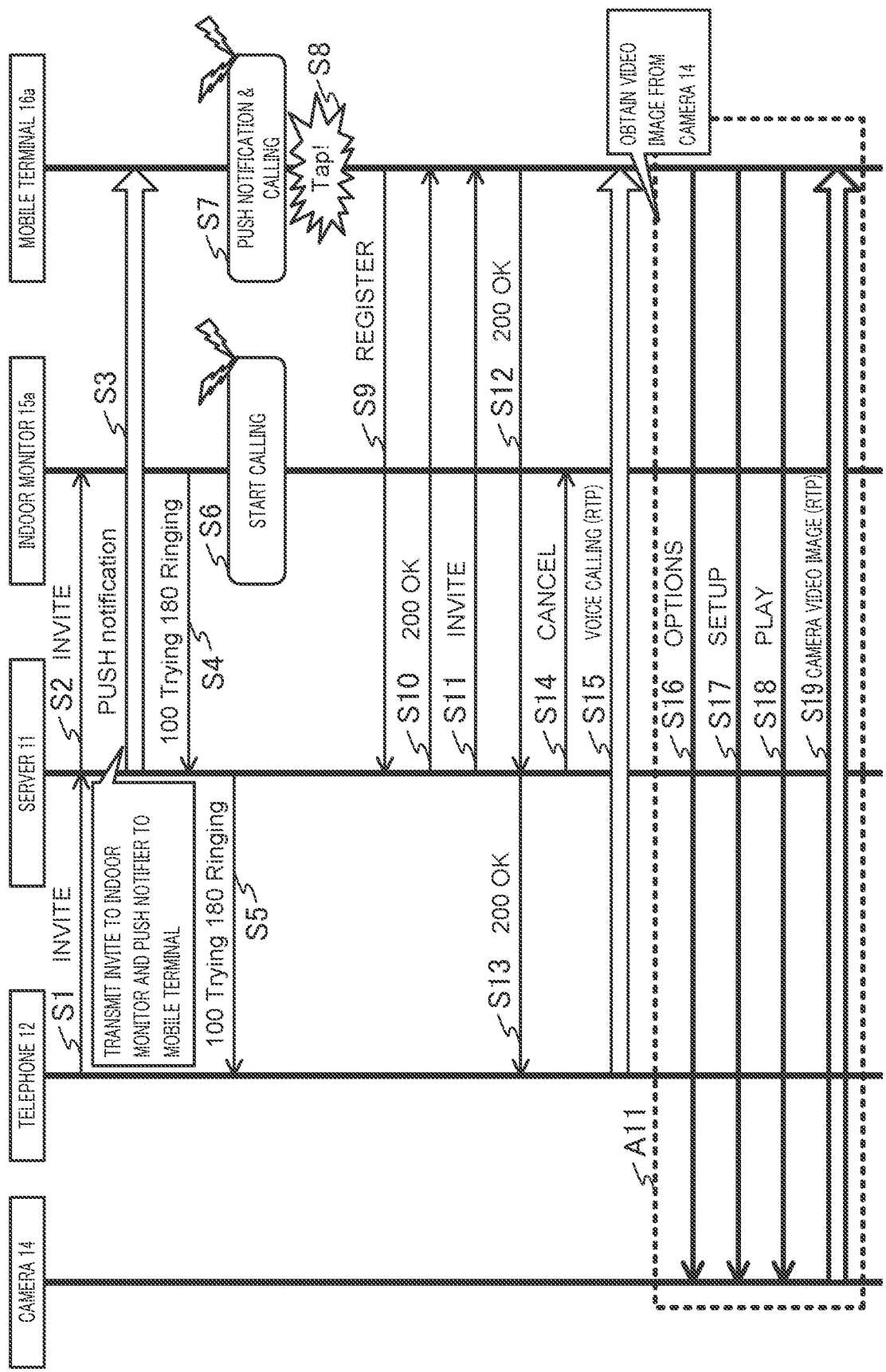
FIG. 10 is a sequence diagram illustrating an operation example of an intercom system.

FIG. 10 is a sequence diagram illustrating an operation example of the intercom system. Here, it is assumed that the receptionist in lobby 3 makes a call to the extension number of room 4 using telephone 12 in response to the request of the visitor to the resident of room 4. When a call is made to the extension number of room 4 using telephone 12, indoor monitors 15a and 15b and mobile terminal 16a are called. In other words, the extension number can also be a common identifier for calling indoor monitors 15a and 15b and mobile terminal 16a.

In response to the input operation of the extension number of room 4 by the receptionist, telephone 12 transmits INVITE containing the extension number of room 4 to server 11 (step S1).

In response to reception of INVITE transmitted in step S1, server 11 transmits INVITE to indoor monitors 15a and 15b (step S2). Note that FIG. 10 omits illustration of indoor monitor 15b.

In response to the reception of INVITE transmitted in step S1, server 11 transmits a push notification (PUSH notification) to mobile terminal 16a (step S3).

Indoor monitors 15a and 15b transmit 100 Trying and 180 Ringing to server 11 (step S4) in response to reception of INVITE transmitted in step S2.

In response to the reception of 100 Trying and 180 Ringing transmitted in step S4, server 11 transmits 100 Trying and 180 Ringing to telephone 12 (step S5).

In response to the reception of INVITE transmitted in step S2, indoor monitors 15a and 15b call the residents of room 4 (step S6). For example, indoor monitors 15a and 15b call the resident by displaying icons on the display or voice.

In response to the reception of the push notification transmitted in step S3, mobile terminal 16a calls the owner of mobile terminal 16a (step S7). For example, mobile terminal 16a calls the owner by icon display on the display, or by voice.

Hereinafter, it is assumed that mobile terminal 16a returned the earliest response to a call made from telephone 12 to indoor monitors 15a and 15b and mobile terminal 16a.

Mobile terminal 16a receives operation corresponding to the call from telephone 12 by the push notification from the owner of mobile terminal 16a (step S8). For example, a push notification icon displayed on the display is tapped on mobile terminal 16a.

Note that, for security reasons, the external server (server 11) generally cannot access mobile terminal 16a such as a smartphone. Still, mobile terminal 16a can receive a push notification from the push server that provides the push service. Accordingly, the intercom system is configured to notify the call from telephone 12 to mobile terminal 16a by using the push notification and cause mobile terminal 16a to make access to server 11.

After receiving operation (tap operation) responding to the call from telephone 12 in step S8, mobile terminal 16a transmits REGISTER to server 11 (step S9).

In response to the reception of REGISTER transmitted in step S9, server 11 transmits 200 OK to mobile terminal 16a (step S10). In response to reception of REGISTER transmitted in step S9, server 11 transmits INVITE to mobile terminal 16a (step S11).

In response to the reception of INVITE transmitted in step S11, mobile terminal 16a transmits 200 OK to server 11 (step S12).

In response to 200 OK received in step S12, server 11 transmits 200 OK to telephone 12 (step S13).

Since mobile terminal 16a returned the earliest response, server 11 transmits CANCEL to indoor monitors 15a and 15b in response to the call from telephone 12 (step S14).

After receiving 200 OK at step S13, telephone 12 starts a voice call with mobile terminal 16a (step S15). That is, a session is established between telephone 12 and mobile terminal 16a. For example, telephone 12 and mobile terminal 16a perform voice call by using a Real time Transport Protocol (RTP).

After receiving operation (for example, tap operation) responding to the call from telephone 12 in step S8, mobile terminal 16a establishes a session with camera 14 on the basis of the RTSP as indicated by dotted line frame A11 in FIG. 10. Subsequently, mobile terminal 16a receives an image from camera 14.

For example, mobile terminal 16a transmits OPTIONS to camera 14 to inquire about the types of functions possessed (step S16).

Mobile terminal 16a transmits SETUP to camera 14 and performs predetermined function setting for camera 14 (step S17). After transmitting SETUP in step S17, mobile terminal 16a transmits PLAY to camera 14 (step S18).

After receiving PLAY transmitted in step S18, camera 14 transmits a camera video image to mobile terminal 16a (step S19). Camera 14 transmits a camera video image to mobile terminal 16a, for example, by using RTP.

In this manner, mobile terminal 16a that has received the call from telephone 12 establishes a session with telephone 12 by the SIP and establishes a session with camera 14 by the RTSP. This enables mobile terminal 16a to talk with telephone 12 and to receive the visitor's image from camera 14.

As described above, push notification receiver 61a of mobile terminal 16a receives the push notification from server 11 that has received the extension number of room 4 from telephone 12. In a case where telephone connector 61b has received operation corresponding to the push notification, the telephone connector 61b establishes a session with telephone 12 via server 11 in accordance with the SIP. In a case where camera connector 61c has received operation corresponding to the push notification, camera connector 61c establishes a session with camera 14 disposed in lobby 3 in accordance with the RTSP. This enables mobile terminal 16a to talk with telephone 12 disposed in lobby 3 of apartment building 1 and to receive an image of the visitor from camera 14. That is, mobile terminal 16a can now make a video calling with telephone 12.

Note that while camera 14 and telephone 12 have been described as separate apparatuses, camera 14 may be a camera provided at lobby intercom 13, and telephone 12 may be a talking function included in lobby intercom 13. In this case, mobile terminal 16a can establish a session and talk with lobby intercom 13 in accordance with SIP, and can also establish a session with lobby intercom 13 in accordance with RTSP and can receive an image of the visitor. That is, mobile terminal 16a can make a video calling with lobby intercom 13.

Embodiment 2

In Embodiment 2, an intercom system for calling a plurality of mobile terminals from lobby intercom 13 will be described. Hereinafter, portions different from those in Embodiment 1 will be described.

Figure 11:
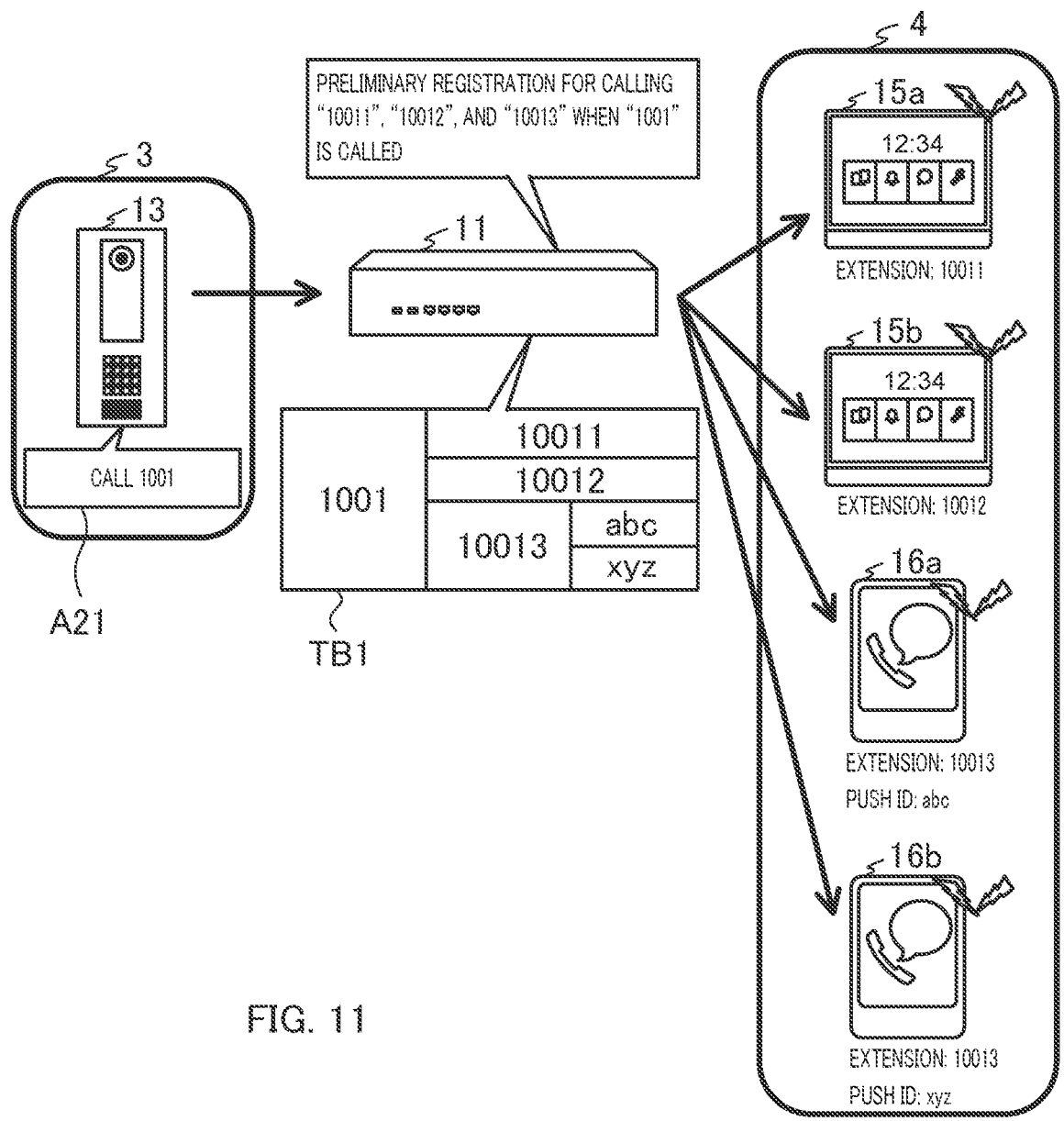
FIG. 11 is a diagram illustrating an example of an intercom system according to Embodiment 2.

FIG. 11 is a diagram illustrating an example of the intercom system according to Embodiment 2. In FIG. 11, the same reference numerals are given to the same components as those in FIG. 1. Note that FIG. 11 illustrates mobile terminal 16b not illustrated in FIG. 1. Mobile terminal 16b is assumed to be possessed by the resident of room 4. Mobile terminals 16a and 16b may be located outside room 4.

Server 11 stores a representative extension number for simultaneously calling indoor monitors 15a and 15b together with mobile terminals 16a and 16b and an extension number for individually calling indoor monitors 15a and 15b, in association with each other. Server 11 also stores a representative extension number for simultaneously calling indoor monitors 15a and 15b together with mobile terminals 16a and 16b and an extension number for simultaneously calling mobile terminals 16a and 16b, in association with each other.

For example, as illustrated in Table TB 1 of FIG. 11, server 11 stores a representative extension number "1001" of room 4 and individual extension numbers "10011" and "10012" of indoor monitors 15a and 15b, in association with each other. Moreover, as illustrated in Table TB 1 of FIG. 11, server 11 stores a representative extension number "1001" of room 4 and a shared extension number "10013" of mobile terminals 16a and 16b, in association with each other.

Additionally in Table TB 1, terminal IDs "abc" and "xyz" for push notifications having been notified (granted) from the push server are stored in association with the shared extension number of mobile terminals 16a and 16b.

Table TB 11 may be configured in storage section 22 illustrated in FIG. 2. Information contained in Table TB 11 is preliminarily stored in Storage section 22. Moreover, while Table TB 11 of FIG. 11 stores the representative extension number of room 4 and the extension number of each of apparatuses in association with each other, Table TB 11 also stores the representative extension number and the extension number of each of apparatuses in association with each other for other rooms as well. In addition, individual extension numbers (different extension numbers) may be assigned to mobile terminals 16a and 16b. Hereinafter, the terminal ID for push notification will be referred to as a push ID in some cases.

An operation example of the intercom system of FIG. 11 will be described. In order to call a resident of room 4 from lobby 3 of apartment building 1, representative extension number "1001" of room 4 is input on lobby intercom 13 as illustrated in balloon A21 of FIG. 11. Lobby intercom 13 transmits the input representative extension number "1001" to server 11.

After receiving the representative extension number "1001", server 11 refers to Table TB 1 and obtains the individual extension number corresponding to the representative extension number "1001". For example, server 11 obtains the extension number "10011" of indoor monitor 15a, the extension number "10012" of indoor monitor 15b, and the extension number "10013" of mobile terminals 16a and 16b. Server 11 further obtains push IDs "abc" and "xyz" for mobile terminals 16a and 16b, respectively.

Server 11 generates an INVITE message with the obtained extension numbers "10011" and "10012", and calls indoor monitors 15a and 15b. In addition, server 11 performs push notification with the obtained push IDs "abc" and "xyz", and calls mobile terminals 16a and 16b.

In this manner, indoor monitors 15a and 15b corresponding to the extension numbers "10011" and "10012" and mobile terminals 16a and 16b corresponding to the push IDs "abc" and "xyz" are called. Note that, among the called indoor monitors 15a and 15b and mobile terminals 16a and 16b, the apparatus that returned the earliest response can talk with lobby intercom 13.

The intercom system illustrated in FIG. 11 can individually call each of indoor monitors 15a and 15b and mobile terminals 16a and 16b. In order to individually call indoor monitors 15a and 15b and mobile terminals 16a and 16b, it is sufficient to input the extension numbers assigned to indoor monitors 15a and 15b and mobile terminals 16a and 16b to lobby intercom 13 (mobile terminals 16a and 16b have shared extension number and can be called simultaneously).

For example, to call mobile terminals 16a and 16b, it is sufficient to input "10013" on lobby intercom 13. After receiving "10013" from lobby intercom 13, server 11 refers to Table TB 1 and obtains the push IDs "abc" and "xyz". Server 11 performs push notification with the obtained push IDs "abc" and "xyz", and calls mobile terminals 16a and 16b, respectively.

Note that in a case where it is assumed that 2000 representative extension numbers can be registered in Table TB1, for example, the intercom system illustrated in FIG. 11 can make representative calls to the 2000 rooms. In addition, in a case where it is assumed that two indoor monitors and four mobile terminals can be linked with one representative extension number (in a case where two indoor monitors and four mobile terminals can be registered to one representative extension number), the intercom system illustrated in FIG. 11 can individually call 12000 apparatuses.

Figure 12:
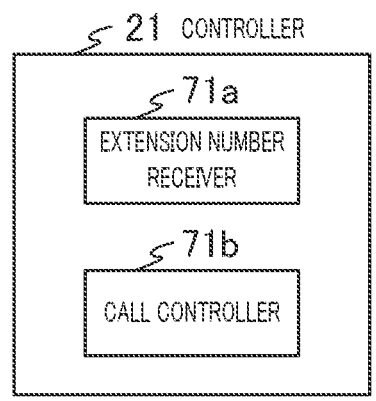
FIG. 12 is a diagram illustrating a block configuration example of a controller of a server.

FIG. 12 is a diagram illustrating a block configuration example of controller 21 of server 11. As illustrated in FIG. 12, controller 21 of server 11 includes extension number receiver 71a and call controller 71b.

The extension number receiver 71a receives a representative extension number or an extension number transmitted from lobby intercom 13.

In a case where the extension number receiver 71a has received the representative extension number, the call controller 71b transmits INVITE based on SIP to indoor monitors 15a and 15b, and transmits a push notification to each of mobile terminals 16a and 16b. The push notification is made via the push server.

For example, in a case where the extension number receiver 71a has received the representative extension number, the call controller 71b obtains extension numbers of indoor monitors 15a and 15b corresponding to the representative extension numbers stored in storage section 22 and push ID of mobile terminals 16a and 16b. Subsequently, the call controller 71b generates INVITE containing the obtained extension numbers of indoor monitors 15a and 15b, and transmits the generated INVITE to indoor monitors 15a and 15b. In addition, the call controller 71b transmits the obtained push ID to the push server, and makes a push notification to mobile terminals 16a and 16b via the push server.

After transmitting INVITE and the push notification, the call controller 71b establishes a session between the apparatus that returned the earliest response among the responses to the INVITE and the push notification, and lobby intercom 13.

For example, it is assumed that mobile terminal 16a returned the response earliest among indoor monitors 15a and 15b that received INVITE and mobile terminals 16a and 16b that received the push notification. In this case, the call controller 71b establishes a session between mobile terminal 16a that returned the earliest response and lobby intercom 13, on the basis of the SIP.

When extension number receiver 71a has received the extension number and the extension number is a number related to indoor monitors 15a and 15, call controller 71b generates and transmits INVITE. When extension number receiver 71a has received the extension number and the extension number is a number related to mobile terminals 16a and 16b, call controller 71b generates and transmits a push notification.

Figure 13:
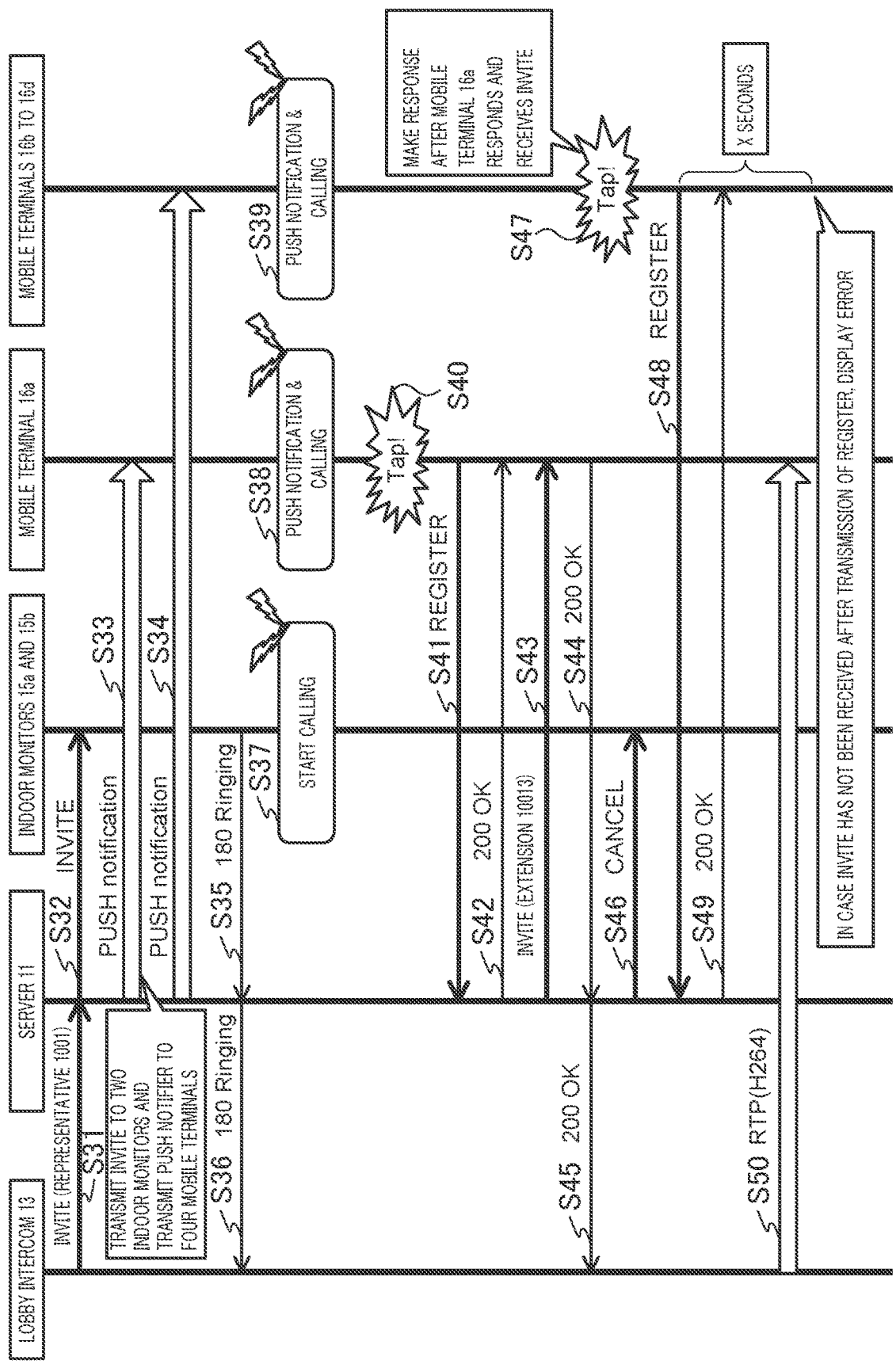
FIG. 13 is a sequence diagram illustrating an operation example of an intercom system.

FIG. 13 is a sequence diagram illustrating an operation example of the intercom system. It is assumed that the visitor calls room 4 with the representative extension number "1001" by using lobby intercom 13. In FIG. 13, it is assumed that there are four mobile terminals 16a to 16d. That is, it is assumed that two indoor monitors 15a and 15b and four mobile terminals 16a to 16d are linked with the representative extension number "1001".

Lobby intercom 13 transmits the representative extension number "1001" received from the visitor to server 11 (step S31).

Server 11 refers to Table TB 1 and obtains the extension number and the push ID linked with the representative extension number "1001" received in step S31. Server 11 transmits INVITE containing the obtained extension number to indoor monitors 15a and 15b (step S32), transmits the obtained push ID to the push server, and transmits a push notification to mobile terminals 16a to 16d (steps S33 and S34).

In response to the reception of INVITE transmitted in step S32, indoor monitors 15a and 15b transmit 180 Ringing to server 11 (step S35).

In response to reception of 180 Ringing transmitted in step S35, server 11 transmits 180 Ringing to lobby intercom 13 (step S36).

In response to the reception of INVITE transmitted in step S32, indoor monitors 15a and 15b call the resident of room 4 (step S37). For example, indoor monitors 15a and 15b call the resident by displaying icons on the display or voice.

In response to the reception of the push notification transmitted in steps S33 and S34, mobile terminals 16a to 16d call the owner of mobile terminals 16a to 16d. For example, mobile terminals 16a to 16d call the owner by icon display or voice on the display (steps S38 and S39).

Hereinafter, it is assumed that mobile terminal 16a has responded earliest to the calls made from lobby intercom 13 to indoor monitors 15a and 15b and mobile terminals 16a to 16d.

Mobile terminal 16a receives, from the owner of mobile terminal 16a, operation corresponding to the call from lobby intercom 13 by the push notification (step S40). For example, a push notification icon displayed on the display is tapped on mobile terminal 16a.

After receiving operation (tap operation) corresponding to the call from lobby intercom 13 in step S40, mobile terminal 16a transmits REGISTER to server 11 (step S41).

In response to the reception of REGISTER transmitted in step S41, server 11 transmits 200 OK to mobile terminal 16a (step S42). In response to reception of REGISTER transmitted in step S41, server 11 transmits INVITE to mobile terminal 16a (step S43).

In response to reception of the INVITE transmitted in step S43, mobile terminal 16a transmits 200 OK to server 11 (step S44).

In response to reception of 200 OK transmitted in step S44, server 11 transmits 200 OK to lobby intercom 13 (step S45).

Server 11 does not transmit INVITE to indoor monitors 15a or 15b that did not return the earliest response, and transmits CANCEL instead (step S46). The timing of transmitting CANCEL is not limited to step S46. The timing may be at any step on and after step S41.

It is assumed that mobile terminal 16a responded to the call from lobby intercom 13 in step S40, and thereafter mobile terminals 16b to 16d responded to the call from lobby intercom 13 (step S47). For example, a push notification icon displayed on the display is tapped on mobile terminals 16b to 16d.

After receiving operation (tap operation) corresponding to the call from lobby intercom 13 in step S47, mobile terminals 16b to 16d transmit REGISTER to server 11 (step S48).

In response to the reception of REGISTER transmitted in step S48, server 11 transmits 200 OK to mobile terminals 16b to 16d (step S49).

Server 11 does not transmit INVITE to mobile terminals 16b to 16d that did not return the earliest response (server 11 has transmitted INVITE, in step S43, to mobile terminal 16a that has made the earliest response). In a case where mobile terminals 16b to 16d have not received INVITE from server 11 even after the lapse of a predetermined time (for example, X seconds) after transmission of REGISTER to server 11 in step S48, mobile terminals 16b to 16d would display an error on the display. For example, mobile terminals 16b to 16d display on the display that another mobile terminal has responded earlier to a call from lobby intercom 13.

After receiving 200 OK at step S45, lobby intercom 13 starts voice call with mobile terminal 16*a* (step S50). That is, a session is established between lobby intercom 13 and mobile terminal 16*a*. Lobby intercom 13 and mobile terminal 16*a* perform voice call by using the Real time Transport Protocol (RTP), for example.

In this manner, after receiving the representative extension number from lobby intercom 13, server 11 refers to Table TB 1, obtains the extension numbers of indoor monitors 15*a* and 15*b* corresponding to the representative extension number, and transmits INVITE. Moreover, server 11 refers to Table TB 1, obtains the push IDs of mobile terminals 16*a* to 16*d* corresponding to the representative extension number, and transmits a push notification. With this configuration, server 11 can call indoor monitors 15*a* and 15*b* and can call the plurality of mobile terminals 16*a* and 16*d*.

As described above, indoor monitors 15*a* and 15*b* and mobile terminals 16*a* and 16*b* are given a shared identifier (representative extension number). Extension number receiver 71*a* of server 11 receives the representative extension number from lobby intercom 13. In response to the reception of the representative extension number, call controller 71*b* transmits INVITE based on the SIP to indoor monitors 15*a* and 15*b*, and also transmits a push notification to each of mobile terminals 16*a* and 16*b*. Subsequently, call controller 71*b* establishes a session between the apparatus that returned the earliest response among the responses to the INVITE and the push notification, and lobby intercom 13. This processing enables lobby intercom 13 disposed in lobby 3 of apartment building 1 to call indoor monitors 15*a* and 15*b* of room 4 and the plurality of mobile terminals 16*a* and 16*b*. Subsequently, lobby intercom 13 can talk with the apparatus that returned the earliest response.

Embodiment 3

In Embodiment 3, registration of mobile terminals to an intercom system will be described. The mobile terminal of the dweller of apartment building 1 has not been registered to the intercom system. Therefore, the mobile terminal of the dweller of apartment building 1 would not be called from telephone 12 or lobby intercom 13. In order to allow the dweller's mobile terminal to be called from telephone 12 and lobby intercom 13, mobile terminals need to be registered to the intercom system. Moreover, even in a case where a resident of apartment building 1 wishes to incorporate a new mobile terminal into the intercom system, the resident registers the mobile terminal to the intercom system. Embodiment 3 enables registration of the mobile terminal to the intercom system easily with ensured security. Hereinafter, portions different from Embodiments 1 and 2 will be described.

Figure 14:
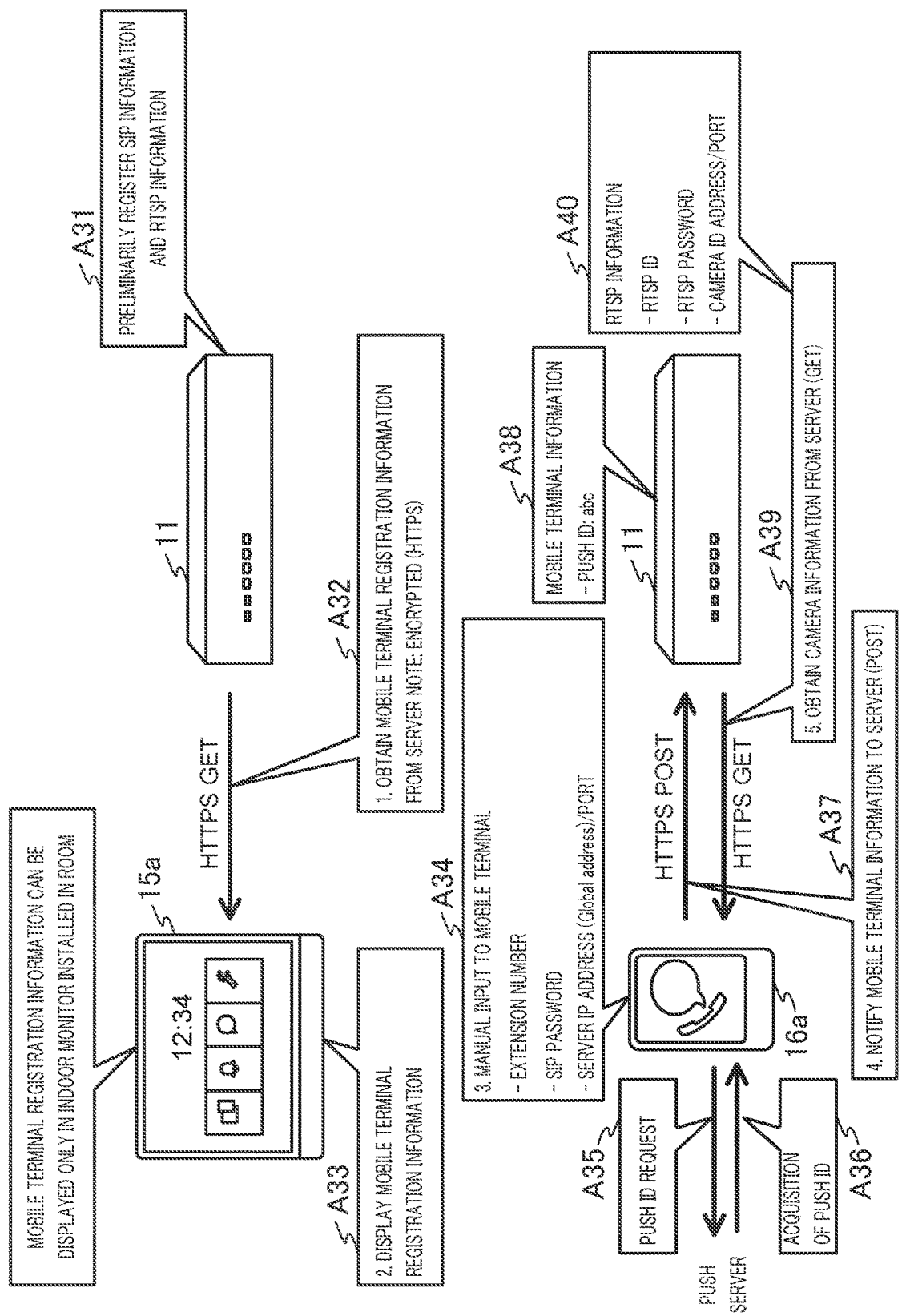
FIG. 14 is a diagram illustrating a method of registering a mobile terminal to an intercom system according to Embodiment 3.

FIG. 14 is a diagram illustrating a method of registering a mobile terminal to an intercom system according to Embodiment 3. In FIG. 14, the same reference numerals are given to the same components as those in FIG. 1. With reference to FIG. 14, an example of registering mobile terminal 16*a* of a resident of room 4 to the intercom system will be described.

As illustrated in balloon A31 in FIG. 14, SIP information and RTSP information are preliminarily stored (registered) in server 11. For example, the SIP information and the RTSP information are stored in server 11 at installation of server 11 in control room 2.

In order to register mobile terminal 16*a* to the intercom system, the resident of room 4 who owns mobile terminal 16*a* presses a setting button displayed on a display of indoor monitor 15*a*, for example. When the setting button is pressed, indoor monitor 15*a* requests server 11 to transmit SIP information.

Note that the SIP information includes extension number, SIP password, IP address of server 11, and port number, given to mobile terminal 16*a*. The SIP information can also be information needed for registration of mobile terminal 16*a* to the intercom system. Hereinafter, the SIP information will be referred to as mobile terminal registration information in some cases.

In response to the SIP information transmission request from indoor monitor 15*a*, server 11 transmits the mobile terminal registration information to indoor monitor 15*a* as illustrated in balloon A32 in FIG. 14. Server 11 transmits mobile terminal registration information to indoor monitor 15*a* by Hypertext Transfer Protocol Secure (HTTPS).

Indoor monitor 15*a* receives the mobile terminal registration information transmitted from server 11, and displays the received mobile terminal registration information on the display as illustrated in balloon A33 in FIG. 14. As described above, the mobile terminal registration information (SIP information) includes the extension number, the SIP password, the IP address of server 11, and the port number, given to mobile terminal 16*a*. Therefore, these pieces of information are displayed on the display of indoor monitor 15*a*.

The resident of room 4 activates an application for intercom system registration stored in mobile terminal 16*a*. Note that mobile terminal 16*a* can download the registration application from a predetermined server.

The resident of room 4 inputs the mobile terminal registration information displayed on the display of indoor monitor 15*a* to mobile terminal 16*a* in accordance with an instruction of the activated registration application. For example, as illustrated in balloon A34 of FIG. 14, the resident of room 4 inputs the extension number, the SIP password, the IP address of server 11, and the port number displayed on the display of indoor monitor 15*a*, to mobile terminal 16*a*. Inputting the mobile terminal registration information enables mobile terminal 16*a* to communicate with server 11.

Mobile terminal 16*a* (registration application of mobile terminal 16*a*) transmits the input mobile terminal registration information to the push server and send a request to give a push ID as illustrated in balloon A35 in FIG. 14. Subsequently, mobile terminal 16*a* receives (obtains) the push ID from the push server, as indicated by balloon A36 in FIG. 14.

After acquisition of the push ID, mobile terminal 16*a* transmits the obtained push ID to server 11 as illustrated in balloon A37 in FIG. 14. Mobile terminal 16*a* transmits the push ID to server 11 by using HTTPS, for example.

Server 11 stores the push ID transmitted from mobile terminal 16*a* as indicated by balloon A38 in FIG. 14. For example, as illustrated in Table TB 1 of FIG. 11, server 11 stores the push ID linked with the extension number. The extension number is a number assigned to mobile terminal 16*a* and displayed on indoor monitor 15*a*.

After receiving the push ID from mobile terminal 16*a*, server 11 transmits the camera information (RTSP information) of camera 14 to mobile terminal 16*a* as indicated by balloon A39 in FIG. 14. Server 11 transmits the camera information to mobile terminal 16*a* by using HTTPS, for example.

The camera information includes an RTSP ID, an RTSP password, an IP address of camera 14, and a port number, as indicated by balloon A40 in FIG. 14. Mobile terminal 16a can receive an image from camera 14 by receiving the camera information. The camera information can be referred to as registration information to be used by mobile terminal 16a to communicate with camera 14 and receive an image from camera 14.

Figure 15:
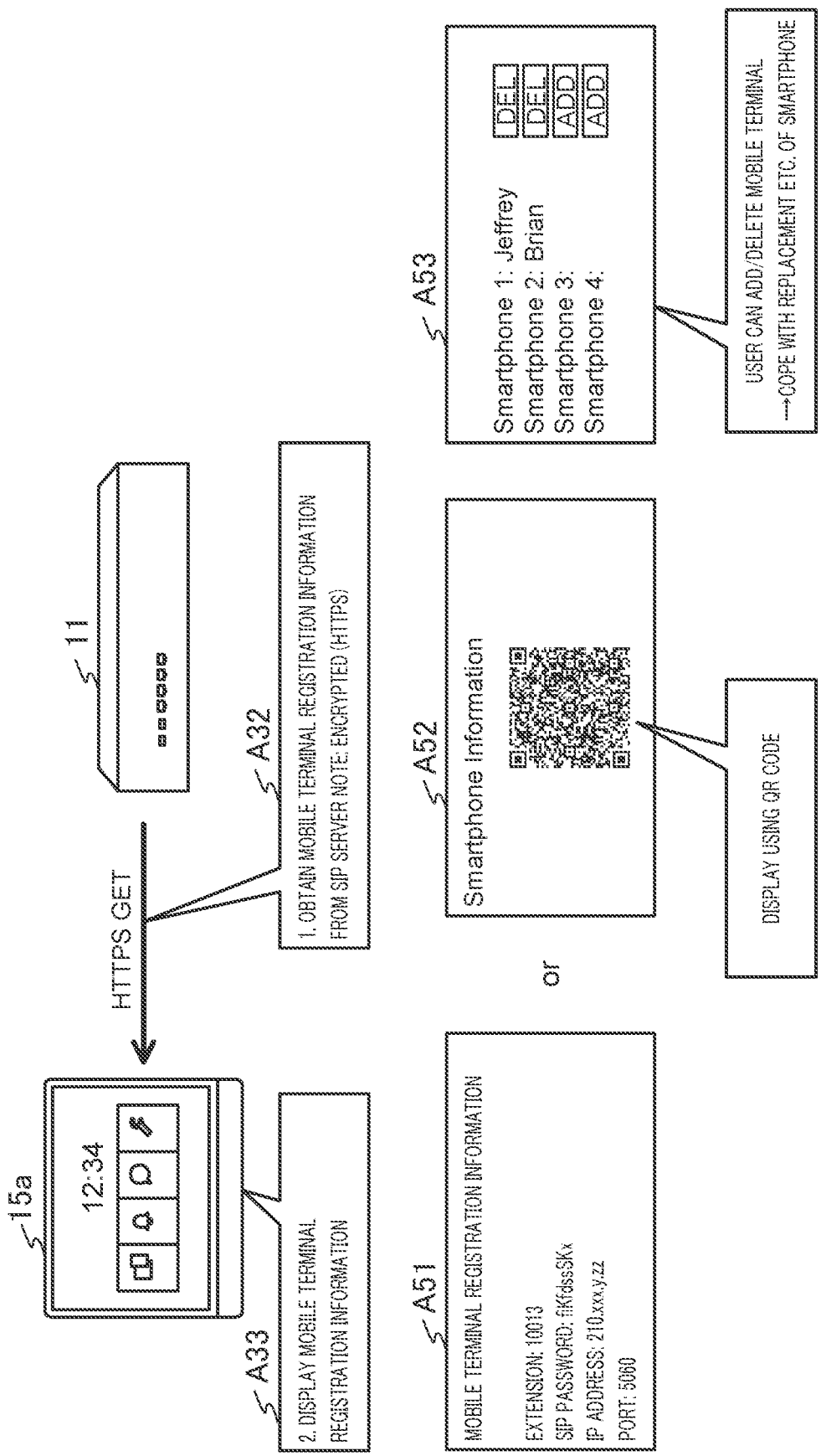
FIG. 15 is a diagram illustrating an input example of mobile terminal registration information to a mobile terminal.

FIG. 15 is a diagram for illustrating an input example of mobile terminal registration information to mobile terminal 16a. In FIG. 15, the same reference numerals are given to the same components as those in FIG. 14.

As described with reference to FIG. 14, mobile terminal registration information is displayed on a display of indoor monitor 15a. For example, the display of indoor monitor 15a displays mobile terminal registration information in text as illustrated in screen A51 in FIG. 15. In this case, the resident of room 4 manually inputs mobile terminal registration information displayed on screen A51, for example.

The mobile terminal registration information may be displayed on the display of indoor monitor 15a by using a camera-readable code. For example, on the display of indoor monitor 15a, mobile terminal registration information may be displayed with QR code (registered trademark of DENSO WAVE INCORPORATED) as illustrated on screen A52 of FIG. 15. In this case, mobile terminal 16a can obtain mobile terminal registration information by capturing the QR code of the mobile terminal registration information with a camera included in the terminal.

As described with reference to FIG. 14, in the case of registering mobile terminal 16a to the intercom system, the resident of room 4 holding mobile terminal 16a presses a setting button displayed on the display of indoor monitor 15a, for example. When the setting button is pressed, screen A53 is displayed on the display of indoor monitor 15a, for example. It is possible to register up to four mobile terminals on screen A53. Here, two mobile terminals have already been registered on screen A53. For example, smartphones of "Jeffrey" and "Brian" are already registered in the intercom system.

"ADD" illustrated on screen A53 indicates that a mobile terminal can be registered to the intercom system. For example, in a case where a resident in room 4 wishes to register a new mobile terminal to the intercom system, "ADD" illustrated on screen A53 is tapped. When "ADD" is tapped, indoor monitor 15a displays screen A51 or screen A52 on the display, for example.

"DEL" illustrated on screen A53 indicates that the mobile terminal already registered in the intercom system can be deleted from the intercom system. For example, in a case where a resident in room 4 wishes to delete the mobile terminal registered in the intercom system from the intercom system, tap "DEL" illustrated on screen A53. When "DEL" is tapped, the push ID of the mobile terminal corresponding to "DEL" is deleted from server 11.

Figure 16:
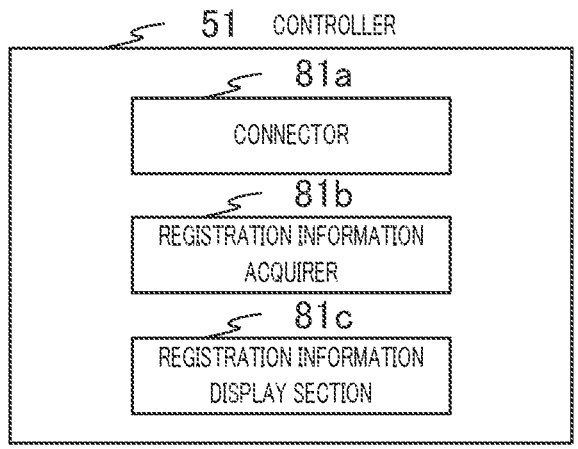
FIG. 16 is a diagram illustrating a block configuration example of a controller of an indoor monitor.

FIG. 16 is a diagram illustrating a block configuration example of controller 51 of indoor monitor 15a. As illustrated in FIG. 16, controller 51 of indoor monitor 15a includes a connector 81a, a registration information acquirer 81b, and a registration information display section 81c.

Connector 81a establishes a session with lobby intercom 13 disposed in lobby 3 via server 11. Server 11 stores mobile terminal registration information (SIP information) for allowing mobile terminal 16a to talk with lobby intercom 13 (in other words, to be registered to the intercom system).

Registration information acquirer 81b obtains mobile terminal registration information (SIP information) from server 11 in accordance with the operation of the resident of room 4. For example, in a case where a resident in room 4 wishes to register mobile terminal 16a to the intercom system, the resident presses a setting button displayed on the display of indoor monitor 15a. In response to depression of the setting button, registration information acquirer 81b makes an access to server 11 and request the server 11 to transmit mobile terminal registration information.

The registration information display section 81c displays, on the display, the mobile terminal registration information obtained by registration information acquirer 81b.

Figure 17:
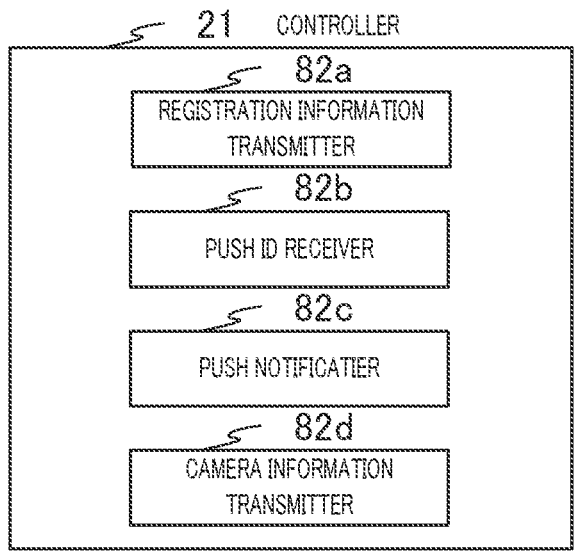
FIG. 17 is a diagram illustrating a block configuration example of a controller of a server.

FIG. 17 is a diagram illustrating a block configuration example of controller 21 of server 11. As illustrated in FIG. 17, controller 21 of server 11 includes registration information transmitter 82a, push ID receiver 82b, push notifier 82c, and camera information transmitter 82d.

The registration information transmitter 82a transmits the mobile terminal registration information to indoor monitor 15a in response to a transmission request of mobile terminal registration information from indoor monitor 15a. The mobile terminal registration information is stored in storage section 22 illustrated in FIG. 2, for example.

Note that indoor monitor 15a that has made a request to transmit the mobile terminal registration information displays the mobile terminal registration information transmitted from registration information transmitter 82a, on the display. Mobile terminal registration information displayed on the display is input to mobile terminal 16a. When the mobile terminal registration information is input, mobile terminal 16a transmits the input mobile terminal registration information to the push server, and obtains a push ID from the push server. Mobile terminal 16a transmits the obtained push ID to server 11.

Push ID receiver 82b receives the push ID transmitted from mobile terminal 16a. Push ID receiver 82b stores the received push ID in storage section 22 linked with the extension number to be given to mobile terminal 16a, for example, as illustrated in Table TB 1 in FIG. 11.

In a case where mobile terminal 16a is called from lobby intercom 13, push notifier 82c transmits the push ID corresponding to mobile terminal 16a to the push server. For example, the push notifier 82c obtains the push ID of mobile terminal 16a called by lobby intercom 13 (for example, called with the representative extension number "1001" of room 4) with reference to Table TB 1, and transmits the push ID to the push server. With this processing, mobile terminal 16a is called from the push server with a push notification. Note that after receiving a response to the push notification (REGISTER in step S9 of FIG. 10 or step S41 of FIG. 13, for example) from mobile terminal 16a, controller 21 performs call control and establishes a session between mobile terminal 16a and lobby intercom 13.

In response to reception of the push ID by push ID receiver 82b, camera information transmitter 82d transmits to mobile terminal 16a, camera information (RTSP information) for allowing mobile terminal 16a to receive the image of camera 14 disposed in lobby 3. Mobile terminal 16a having received the camera information can now access camera 14 disposed in lobby 3 by the received camera information and can receive the image captured by camera 14.

Figure 18:
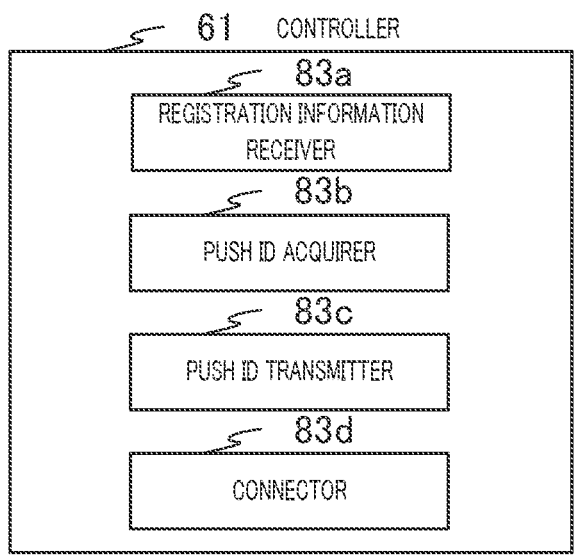
FIG. 18 is a diagram illustrating a block configuration example of a controller of a mobile terminal.

FIG. 18 is a diagram illustrating a block configuration example of controller 61 of mobile terminal 16a. As illustrated in FIG. 18, controller 61 of mobile terminal 16a includes registration information receiver 83a, push ID acquirer 83b, push ID transmitter 83c, and connector 83d.

The registration information receiver 83a receives mobile terminal registration information for enabling mobile terminal 16a to talk with lobby intercom 13. Mobile terminal registration information is displayed on the display of indoor monitor 15a. Registration information receiver 83a receives (obtains) mobile terminal registration information by manual input by the owner of mobile terminal 16a, or receives mobile terminal registration information by the camera included in mobile terminal 16a.

Push ID acquirer 83b transmits the mobile terminal registration information received by registration information receiver 83a to the push server, thereby requesting the push ID assignment and then, obtains the push ID.

The push ID transmitter 83c transmits the push ID obtained by push ID acquirer 83b to server 11. The push ID transmitted to server 11 is stored in server 11 linked with the extension number assigned to mobile terminal 16a (extension number included in the mobile terminal registration information displayed on the display of indoor monitor 15a).

After receiving a push notification from the push server, and has received response operation to the received push notification, connector 83d transmits REGISTER to server 11. After receiving INVITE for the REGISTER from server 11, connector 83d establishes a session with server 11. In a case where INVITE for REGISTER has not been received from server 11 even after a predetermined time has elapsed, connector 83d displays an error on the display (displaying that another apparatus has received a call from lobby intercom 13, for example).

Figure 19:
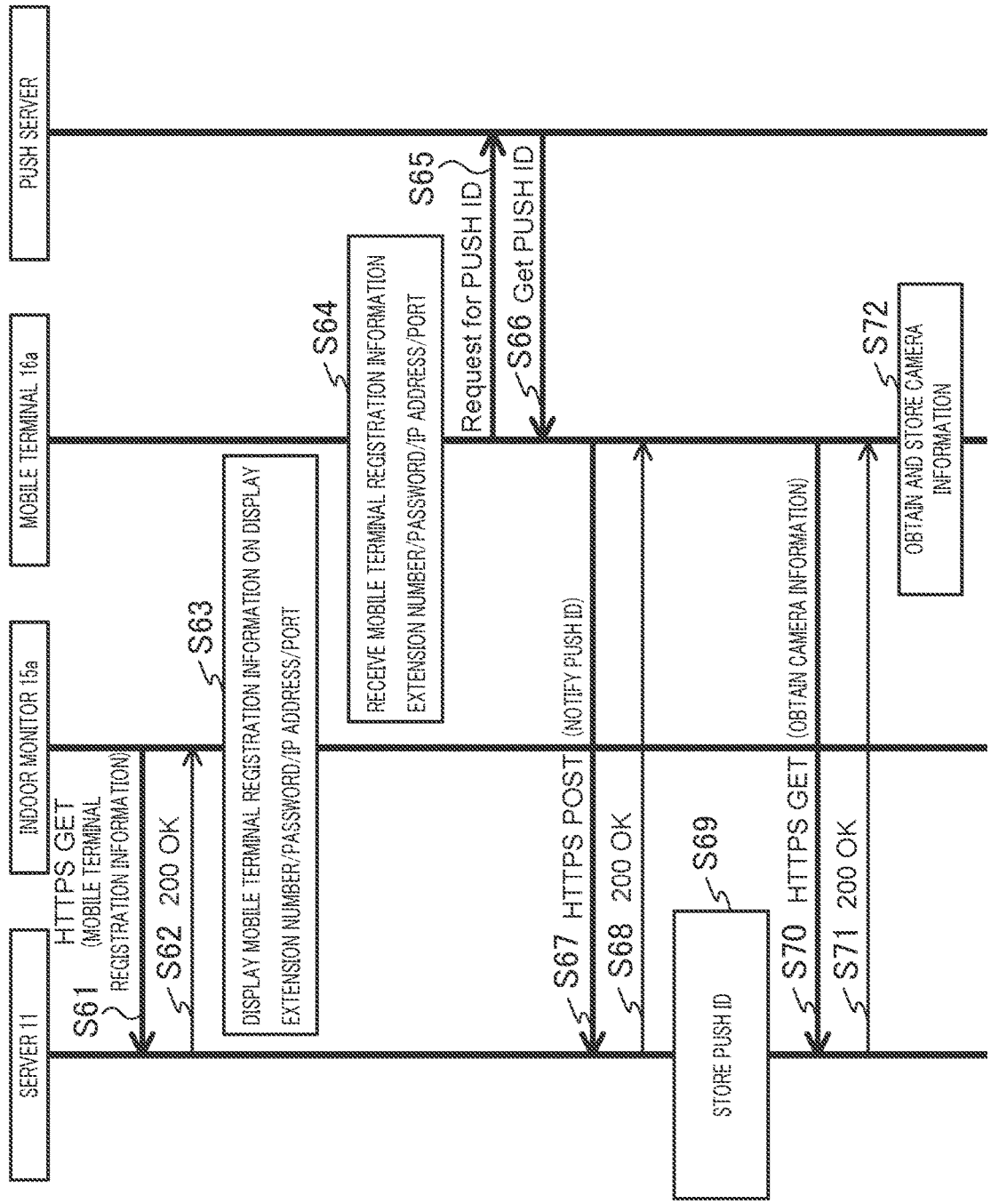
FIG. 19 is a sequence diagram illustrating an example of registration operation of a mobile terminal to an intercom system.

FIG. 19 is a sequence diagram illustrating an example of registration operation of mobile terminal 16a to the intercom system. It is assumed, for example, that the resident of room 4 presses (taps) a setting button displayed on the display of indoor monitor 15a. It is assumed, for example, that depression of the setting button displays screen A53 on the display of indoor monitor 15a. It is assumed that the resident of room 4 has pressed "ADD" button on screen A53.

In response to depression of "ADD" button, indoor monitor 15a requests server 11 to give the mobile terminal registration information (step S61).

Indoor monitor 15a receives 200 OK including the mobile terminal registration information from server 11 (step S62).

Indoor monitor 15a displays the mobile terminal registration information received in step S62, on the display (step S63).

Mobile terminal 16a receives input of mobile terminal registration information displayed on the display of indoor monitor 15a from the owner of mobile terminal 16a (step S64).

After receiving the input of the mobile terminal registration information in step S64, mobile terminal 16a requests the push server to give a push ID (step S65). In response to the push ID request, the push server assigns a push ID to mobile terminal 16a and transmits the assigned push ID to mobile terminal 16a.

Mobile terminal 16a obtains the push ID from the push server (step S66). Mobile terminal 16a transmits the obtained push ID to server 11 (step S67).

After receiving the push ID transmitted in step S67, server 11 transmits 200 OK to mobile terminal 16a (step S68).

Server 11 stores the push ID transmitted in step S67 on Table TB 1 (step S69).

After receiving 200 OK transmitted in step S68, mobile terminal 16a requests server 11 to give camera information of camera 14 (step S70).

Mobile terminal 16a receives 200 OK including the camera information from server 11 (step S71).

Mobile terminal 16a stores the camera information received in step S71 in the storage section (step S72).

In this manner, the information for registering mobile terminal 16a to the intercom system is displayed on the display of indoor monitor 15a and input to mobile terminal 16a. With this processing, mobile terminal 16a can be easily and safely added to the intercom system.

Figure 20:
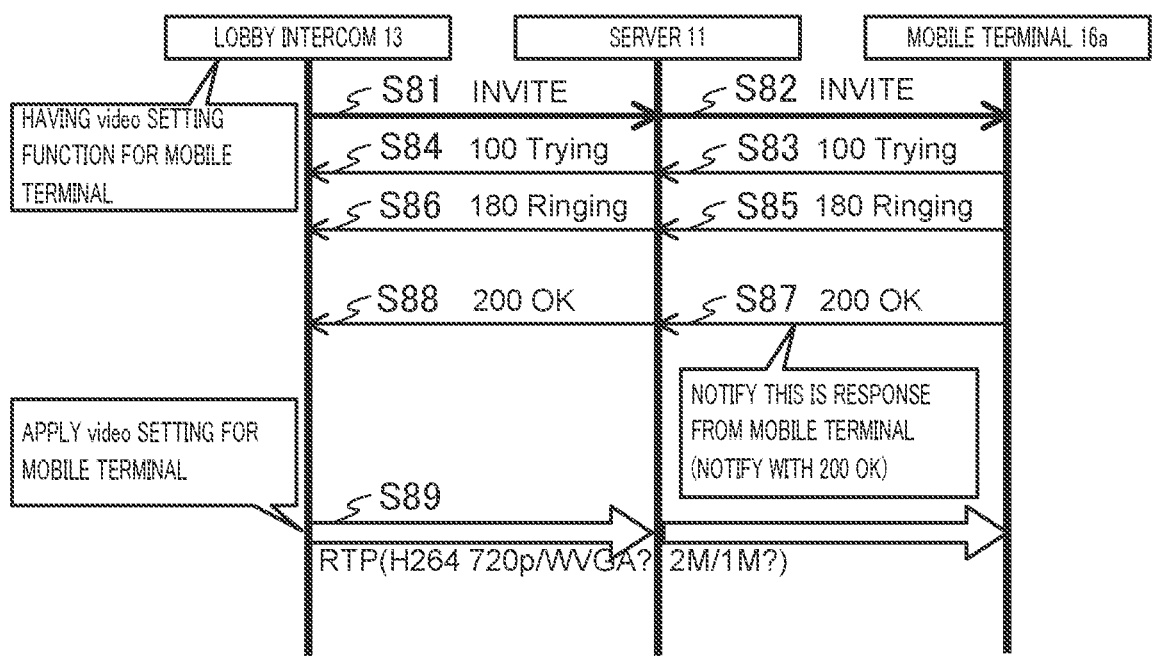
FIG. 20 is a sequence diagram illustrating an operation example of video setting of lobby intercom.

FIG. 20 is a sequence diagram illustrating an operation example of video setting of lobby intercom 13. It is assumed that lobby intercom 13 has received operation for calling mobile terminal 16a. For example, it is assumed that lobby intercom 13 receives the extension number of mobile terminal 16a.

Lobby intercom 13 transmits an INVITE to server 11 in response to reception of the operation for calling mobile terminal 16a (step S81).

In response to the reception of the INVITE transmitted in step S81, server 11 transmits INVITE to mobile terminal 16a (step S82).

In response to reception of the INVITE transmitted in step S82, mobile terminal 16a transmits 100 Trying to server 11 (step S83).

In response to reception of 100 Trying transmitted in step S83, server 11 transmits 100 Trying to lobby intercom 13 (step S84).

In response to the reception of INVITE transmitted in step S82, mobile terminal 16a transmits 180 Ringing to server 11 (step S85).

In response to reception of 180 Ringing transmitted in step S85, server 11 transmits 180 Ringing to lobby intercom 13 (step S86).

Mobile terminal 16a transmits 200 OK to server 11 as a response to INVITE transmitted in step S82 (step S87). The 200 OK transmitted in step S87 includes information indicating that 200 OK is a response from a mobile terminal (smartphone, for example).

In response to reception of 200 OK transmitted in step S87, server 11 transmits 200 OK to lobby intercom 13 (step S88). The 200 OK transmitted in step S88 includes information indicating that 200 OK is a response from a mobile terminal (smartphone, for example).

In response to the 200 OK received in step S88, lobby intercom 13 transmits an image to mobile terminal 16a (step S89). At this time, on the basis of the information included in the 200 OK transmitted in step S88 indicating that the 200 OK is a response from the mobile terminal, lobby intercom 13 selects video setting for mobile terminal 16a of lobby intercom 13 and transmits an image captured by camera 14.

In this manner, lobby intercom 13 can transmit an image corresponding to the function of mobile terminal 16a that is to be called.

Note that while an operation example of video setting of lobby intercom 13 has been described with reference to FIG. 20, description can be similarly applied to entrance intercom 17.

As described above, connector 81a of indoor monitor 15a establishes a session with lobby intercom 13 disposed in lobby 3 of apartment building 1 via server 11. Server 11 stores mobile terminal registration information for enabling mobile terminal 16a to talk with lobby intercom 13. Registration information acquirer 81b obtains mobile terminal registration information from server 11 in response to operation of the resident of room 4. Registration information display section 81c displays mobile terminal registration information on the display. With this processing, it is possible to easily and safely add new mobile terminal 16a to the intercom system.

Furthermore, storage section 22 of server 11 stores mobile terminal registration information for enabling mobile terminal 16a to talk with lobby intercom 13. In response to a request from indoor monitor 15a, registration information transmitter 82a transmits mobile terminal registration information stored in storage section 22 to indoor monitor 15a. With this processing, it is possible to easily and safely add new mobile terminal 16a to the intercom system.

In addition, indoor monitor 15a receives mobile terminal registration information for allowing mobile terminal 16a to talk with lobby intercom 13 from server 11 and displays the information on the display. Registration information receiver 83a of mobile terminal 16a receives the mobile terminal registration information displayed on the display of indoor monitor 15a. Push ID acquirer 83b transmits the mobile terminal registration information received by registration information receiver 83a to the push server, and thereby obtains the push ID. The push ID transmitter 83c transmits the push ID obtained by the push ID acquirer 83b to server 11. With this processing, it is possible to easily and safely add new mobile terminal 16a to the intercom system.

Embodiment 4

In Embodiment 4, history management of information related to the intercom system on mobile terminals 16a and 16b will be described. Mobile terminals 16a and 16b scroll-display an incoming call history from the intercom system, images transmitted from the intercom system, or the like, in chronological order on the display. This enables the resident of room 4 to view past information related to the intercom system by using mobile terminals 16a and 16b. Hereinafter, portions different from Embodiments 1 to 3 will be described.

Figure 21:
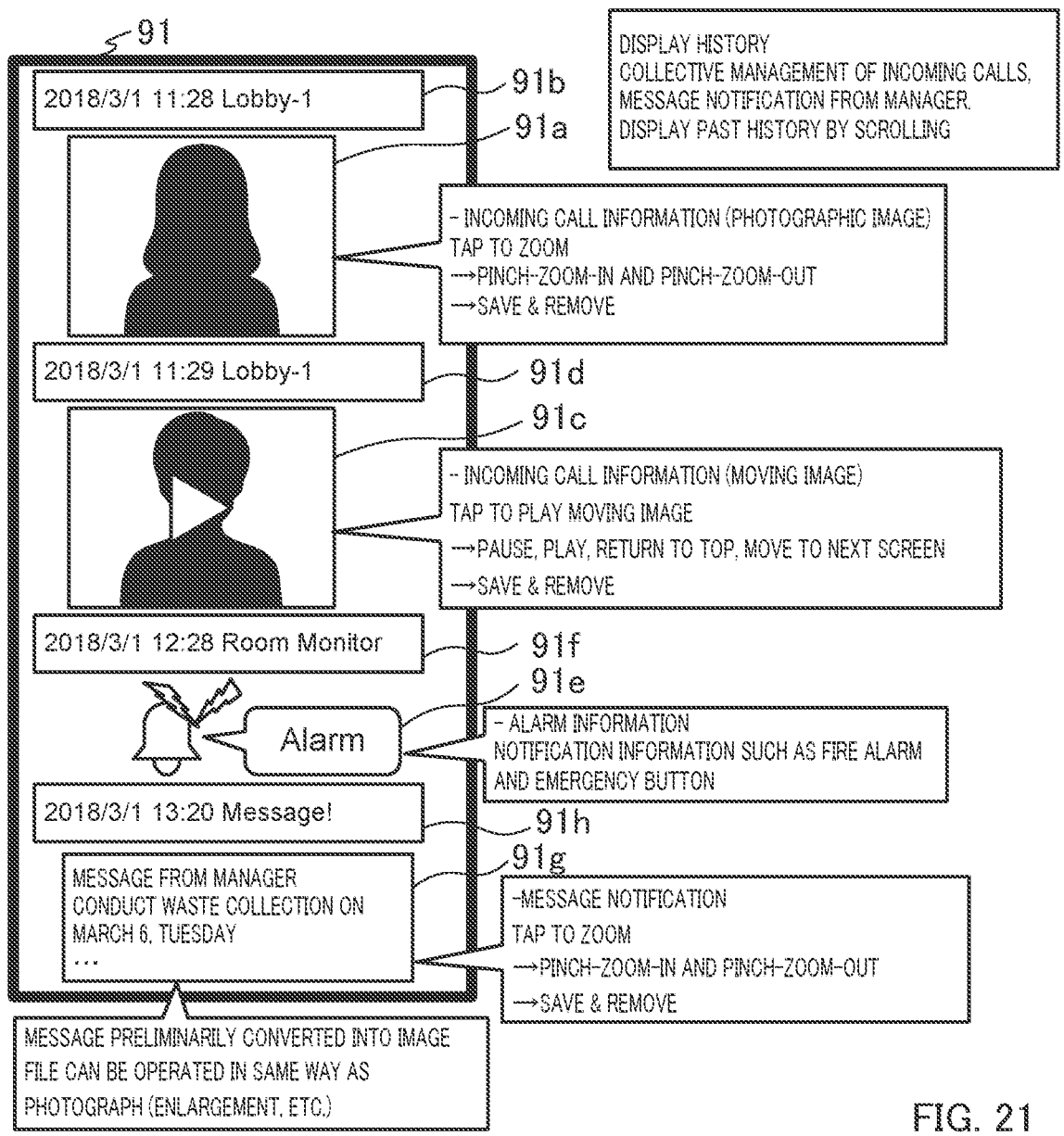
FIG. 21 is a diagram illustrating an operation example of history management of a mobile terminal.

FIG. 21 is a diagram illustrating an operation example of history management of mobile terminal 16a. History management screen 91 in FIG. 21 illustrates an example of a history management screen displayed on a display of mobile terminal 16a. History management screen 91 is displayed in response to the tapping on a history management application icon displayed on a standby screen of mobile terminal 16a, for example.

History management screen 91 displays still image 91a captured by lobby intercom 13, for example. History management screen 91 further displays shooting date and time 91b at which lobby intercom 13 captured still image 91a. Still image 91a is an image file and can be enlarged and reduced by pinch-zoom-in operation and pinch-zoom-out operation, respectively.

History management screen 91 displays moving image 91c captured by lobby intercom 13, for example. History management screen 91 further displays shooting date and time 91d at which lobby intercom 13 captured moving image 91c. The owner of mobile terminal 16a can use tap operation to perform operation such as playing, pausing, or returning to the top regarding moving image 91c.

History management screen 91 displays alarm information 91e notified from indoor monitor 15a, for example. History management screen 91 further displays reception date/time 91f at which indoor monitor 15a received alarm information 91e.

Note that indoor monitor 15a is connected to an apparatus such as a fire alarm or an emergency button apparatus, for example. When indoor monitor 15a receives an abnormality signal from these apparatuses, indoor monitor 15a transmits abnormality information to mobile terminal 16a. Mobile terminal 16a displays alarm information 91e on the basis of the information transmitted from indoor monitor 15a.

History management screen 91 displays message 91g from a manager of apartment building 1, for example. History management screen 91 further display reception date/time 91h of reception of message 91g, for example. Message 91g is an image file and can be enlarged and reduced by the same operation applied to still image 91a.

Mobile terminal 16a displays the information (still image, moving image, alarm information, message, etc.) displayed on history management screen 91, in chronological order. For example, in a case where mobile terminal 16a receives the latest information, mobile terminal 16a displays the information in addition to the bottom of history management screen 91. In the example of FIG. 21, message 91g is the latest information.

Furthermore, mobile terminal 16a scroll-displays the information displayed on history management screen 91. This display enables the owner of mobile terminal 16a to also view past information. For example, the owner of mobile terminal 16a can view past information by flicking down the display.

Figure 22:
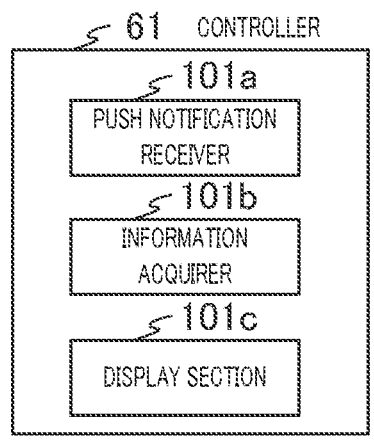
FIG. 22 is a diagram illustrating a block configuration example of a controller of a mobile terminal.

FIG. 22 is a diagram illustrating a block configuration example of controller 61 of mobile terminal 16a. Mobile terminal 16a includes push notification receiver 101a, information acquirer 101b, and display section 101c.

The push notification receiver 101a receives a push notification from the push server.

Information acquirer 101b accesses server 11 in response to reception of the push notification by push notification receiver 101a, and obtains information related to the history of intercom system from server 11. The obtained information is stored in storage section 62. Furthermore, information acquirer 101b receives moving images of lobby intercom 13, camera 14, or entrance intercom 17 captured during a call, and stores the moving images in storage section 62.

Display section 101c displays information related to the history of the intercom system on a display. For example, display section 101c displays information related to the history of the intercom system on the display in scroll-display in chronological order.

Figure 23:
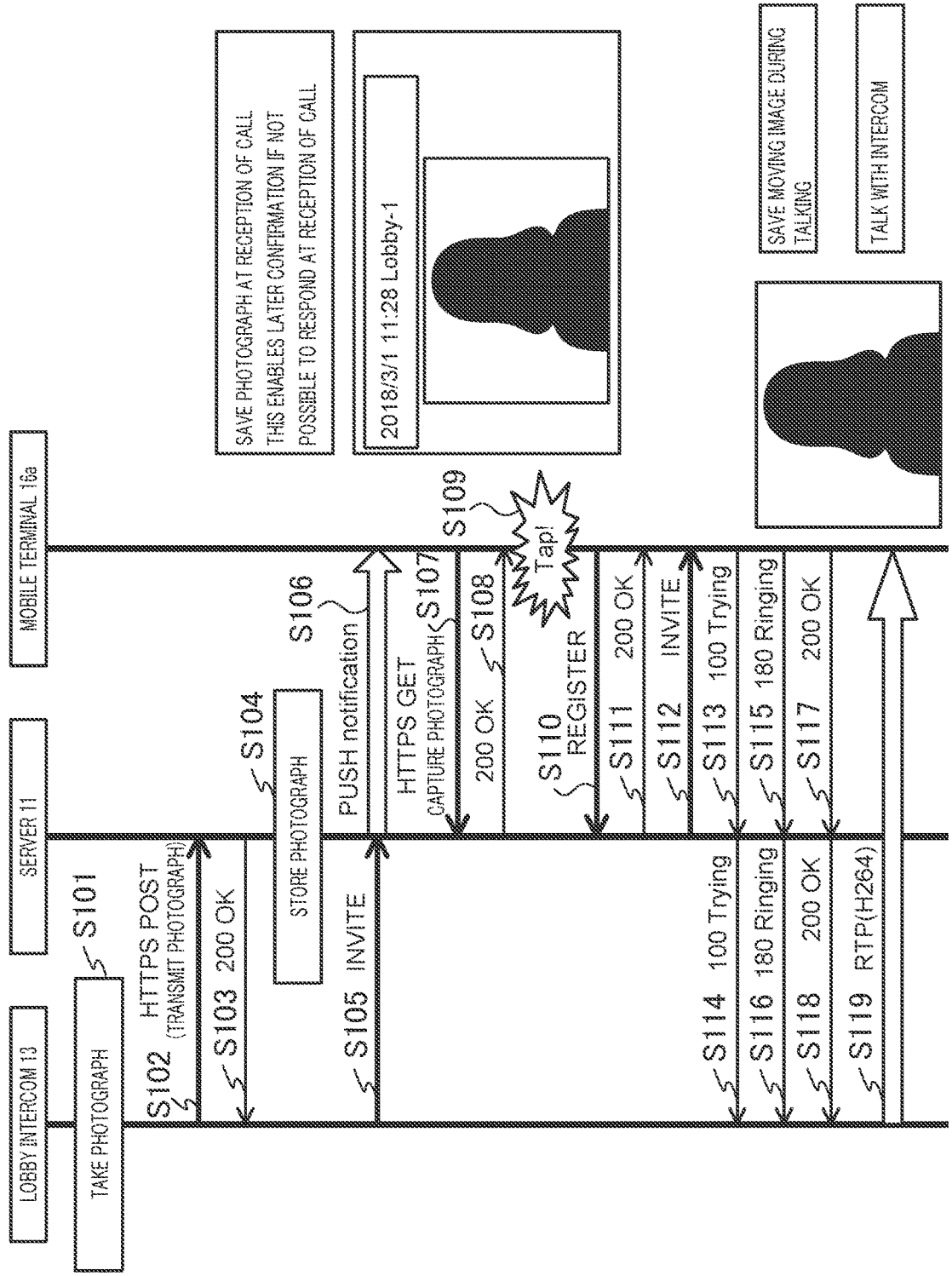
FIG. 23 is a sequence diagram illustrating an operation example of history management of an intercom system.

FIG. 23 is a sequence diagram illustrating an operation example of history management of the intercom system. History management of a still image (photographic image) will be described with reference to FIG. 23. It is assumed that lobby intercom 13 has received an extension number of mobile terminal 16a from a visitor, for example.

In response to reception of the extension number of mobile terminal 16a, lobby intercom 13 images the visitor with camera 14 included in the lobby intercom 13 (step S101).

Lobby intercom 13 transmits the photographic image captured in step S101 to server 11 (step S102).

In response to the reception of the image transmitted in step S102, server 11 transmits 200 OK to lobby intercom 13 (step S103).

Server 11 stores the image transmitted in step S102 (step S104).

Lobby intercom 13 transmits INVITE to server 11 (step S105).

In response to the reception of INVITE transmitted in step S105, server 11 transmits a push notification to mobile terminal 16a (step S106).

In response to reception of the push notification transmitted in step S106, mobile terminal 16a attempts to obtain the image stored in server 11 (image transmission request) (step S107).

In response to the image transmission request from mobile terminal 16a in step S107, server 11 transmits 200

OK including an image (step S108). Mobile terminal 16a stores the image transmitted from server 11 in the storage section.

Mobile terminal 16a receives operation corresponding to the call from lobby intercom 13 using the push notification, from the owner of mobile terminal 16a (step S109). For example, a push notification icon displayed on the display is tapped on mobile terminal 16a.

After receiving operation (tap operation) corresponding to the call from lobby intercom 13 in step S109, mobile terminal 16a transmits REGISTER to server 11 (step S110).

In response to the reception of REGISTER transmitted in step S110, server 11 transmits 200 OK to mobile terminal 16a (step S111). In response to reception of REGISTER transmitted in step S110, server 11 transmits INVITE to mobile terminal 16a (step S112).

In response to reception of the INVITE transmitted in step S112, mobile terminal 16a transmits 100 Trying to server 11 (step S113).

In response to reception of 100 Trying transmitted in step S113, server 11 transmits 100 Trying to lobby intercom 13 (step S114).

In response to the reception of INVITE transmitted in step S112, mobile terminal 16a transmits 180 Ringing to server 11 (step S115).

In response to reception of 180 Ringing transmitted in step S115, server 11 transmits 180 Ringing to lobby intercom 13 (step S116).

In response to reception of the INVITE transmitted in step S112, mobile terminal 16a transmits 200 OK to server 11 (step S117). The 200 OK transmitted in step S117 includes information indicating that 200 OK is a response from a mobile terminal (smartphone, for example).

In response to reception of 200 OK transmitted in step S117, server 11 transmits 200 OK to lobby intercom 13 (step S118). The 200 OK transmitted in step S118 includes information indicating that 200 OK is a response from a mobile terminal (smartphone, for example).

In response to the 200 OK received in step S118, lobby intercom 13 transmits an image (moving image) to mobile terminal 16a (step S119). At this time, on the basis of the information included in the 200 OK transmitted in step S118 indicating that the 200 OK is a response from the mobile terminal, lobby intercom 13 selects video setting for mobile terminal 16a and transmits an image captured by the camera.

Before the response to the push notification (step S109), mobile terminal 16a requests an image (photographic image) from server 11 (step S108). Subsequently, mobile terminal 16a stores the image in the storage section. When the history management application is activated, mobile terminal 16a displays the stored image as still image 91a illustrated in FIG. 21, for example. This enables the owner of mobile terminal 16a to confirm that there was an incoming call with an image by activating the history management application later even if it is difficult to respond to the incoming call from lobby intercom 13.

In addition, mobile terminal 16a stores the moving image during the call transmitted in step S119 in the storage section. When the history management application is activated, mobile terminal 16a displays the stored moving image as moving image 91c illustrated in FIG. 21, for example.

Note that while an operation example of video setting of lobby intercom 13 has been described with reference to FIG. 20, description can be similarly applied to camera 14 and entrance intercom 17.

Figure 24:
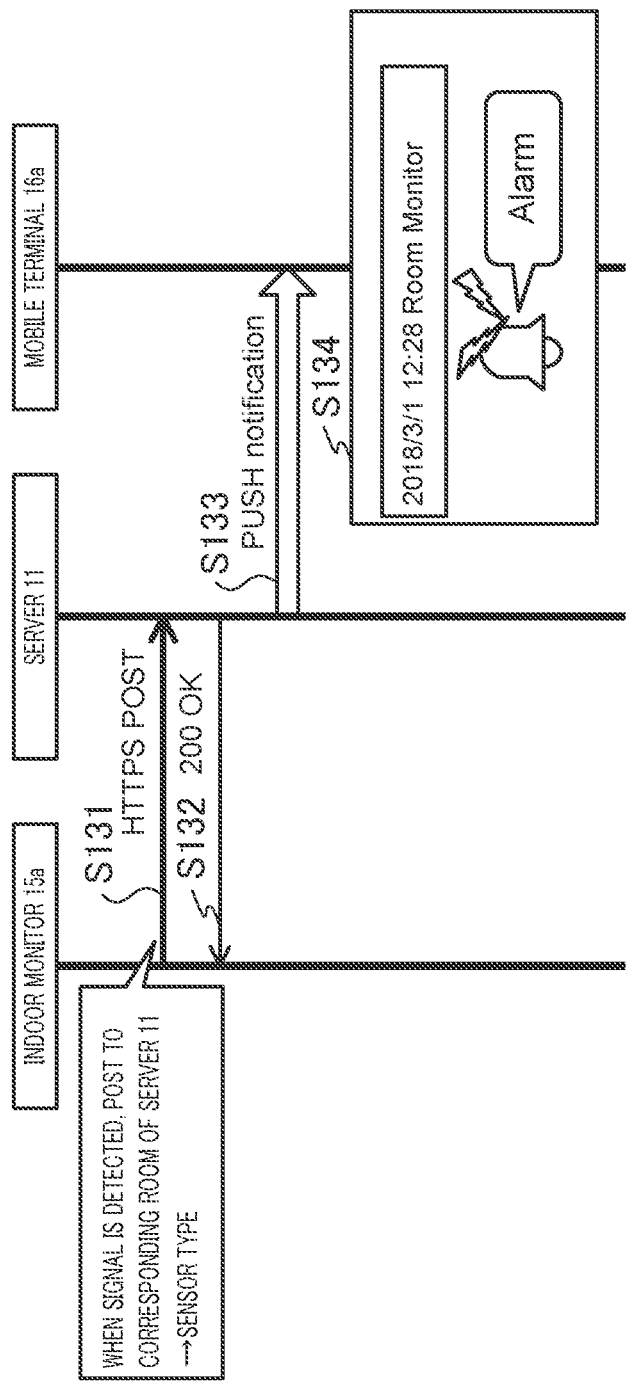
FIG. 24 is a sequence diagram illustrating an operation example of history management of an intercom system.

FIG. 24 is a sequence diagram illustrating an operation example of history management of the intercom system. With reference to FIG. 24, alarm history management will be described. Indoor monitor 15a is connected to an apparatus such as a fire alarm or an emergency button apparatus, for example. It is now assumed that indoor monitor 15a has received a signal indicating that a fire has occurred, from a fire alarm, for example. Alternatively, it is assumed that indoor monitor 15a has received a signal indicating that a button has been pressed, for example, from the emergency button apparatus.

Indoor monitor 15a notifies server 11 that a signal has been received from an apparatus such as a fire alarm or an emergency button apparatus (step S131). Indoor monitor 15a may transmit the signal type information (for example, information indicating whether the signal is from a fire alarm or a signal from the emergency button apparatus) to server 11.

In response to the notification of step S131, server 11 transmits 200 OK to indoor monitor 15a (step S132).

In response to the notification of step S131, server 11 transmits a push notification to mobile terminal 16a (step S133). After receiving the push notification, mobile terminal 16a notifies the owner, for example, by icon display on the display or by voice.

After reception of the activation operation of the history management application from the owner, mobile terminal 16a displays alarm information (step S134). For example, mobile terminal 16a displays alarm information such as the alarm information 91e illustrated in FIG. 21.

In a case where mobile terminal 16a notifies the owner of the push notification with an image (icon), mobile terminal 16a may notify the owner of the alarm type. For example, in a case where mobile terminal 16a receives the push notification based on the fire alarm, mobile terminal 16a displays an image of the push notification related to the fire alarm. In addition, in a case where mobile terminal 16a has received a push notification based on the emergency button apparatus, mobile terminal 16a displays an image of the push notification related to the emergency button apparatus. This allows the owner to recognize that a fire has occurred or the emergency button is pressed with an icon indicating a push notification.

Figure 25:
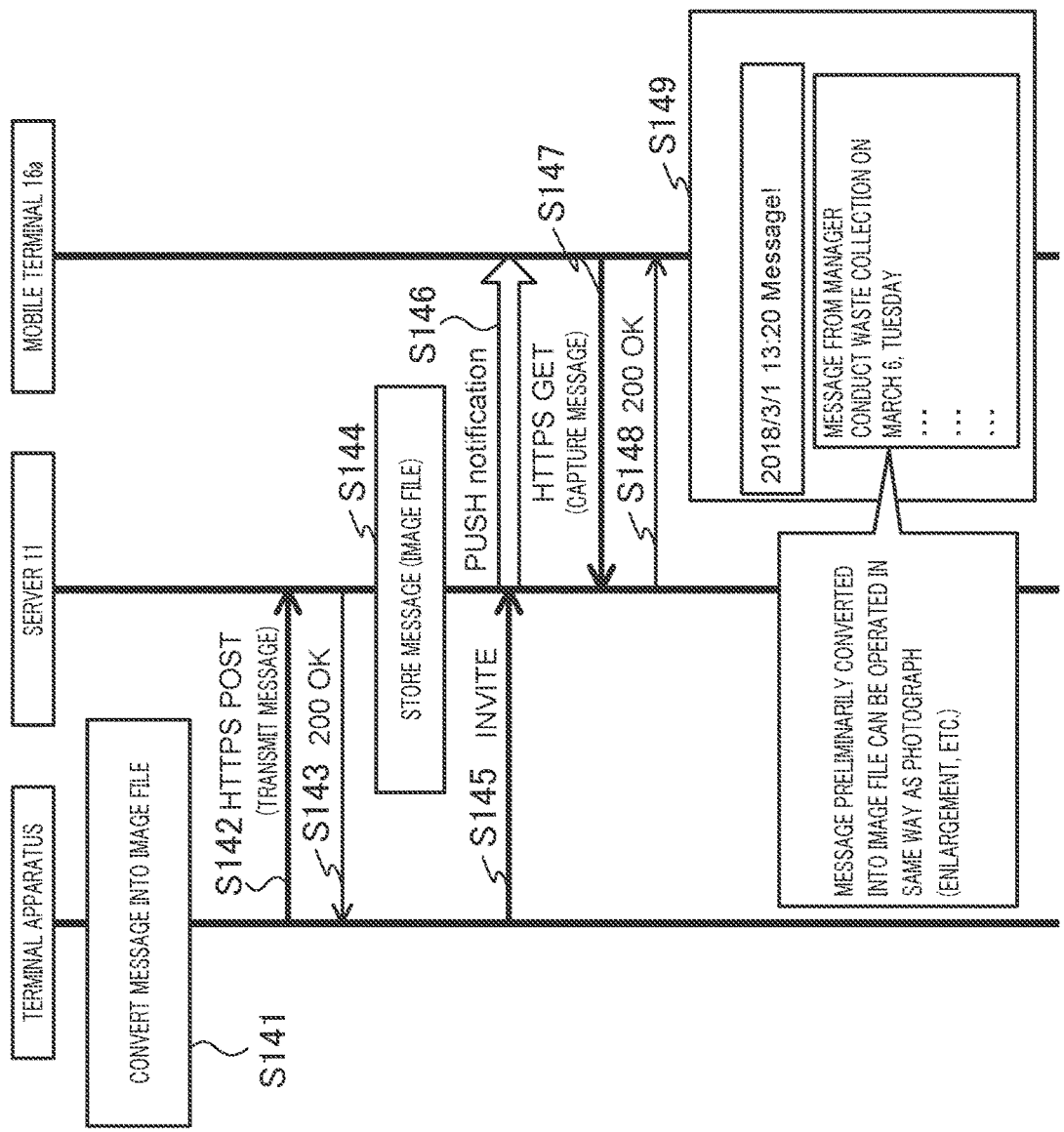
FIG. 25 is a sequence diagram illustrating an operation example of history management of an intercom system.

FIG. 25 is a sequence diagram illustrating an operation example of history management of the intercom system. History management of messages issued from an manager will be described with reference to FIG. 25. Server 11 is connected to a terminal apparatus used by a manager of apartment building 1 via a network such as a LAN installed in apartment building 1. The terminal apparatus may be a personal computer, for example. Using the terminal apparatus, the manager creates a text message addressed to a resident of apartment building 1, for example.

The terminal apparatus converts the text message created by the manager into an image file (step S S141).

The terminal apparatus transmits the message converted into the image file in step S141 to server 11 (step S142).

In response to reception of the message transmitted in step S142, server 11 transmits 200 OK to the terminal apparatus (step S143).

Server 11 stores the message transmitted in step S142 in the storage section (step S144).

In response to reception of 200 OK in step S143, the terminal apparatus transmits INVITE to server 11 (step S145).

In response to reception of the INVITE transmitted in step S145, server 11 sends a push notification to mobile terminal 16a (step S146).

In response to the reception of the push notification transmitted in step S146, mobile terminal 16a attempts to obtain the image stored in server 11 (image transmission request) (step S147). Mobile terminal 16a stores the image transmitted from server 11 in the storage section.

In response to the image transmission request from mobile terminal 16a in step S147, server 11 transmits 200 OK including the image of the message (step S148).

For example, when the history management application is activated, mobile terminal 16a displays the message received in step S148 on the display in chronological order (step S149).

As described above, push notification receiver 101a of mobile terminal 16a receives a push notification from the push server. Information acquirer 101b accesses server 11 in response to reception of the push notification by push notification receiver 101a, and obtains event information related to the history of intercom system from server 11. Display section 101c displays event information related to the history of the intercom system on a display. Display section 101c displays event information related to the history of the intercom system on the display in scroll-display in chronological order. This enables the resident of room 4 to view event information related to the intercom system by using mobile terminal 16a.

Each of functional blocks used in the description of the above embodiments is typically implemented as an LSI which is an integrated circuit. Each of functions may be individually formed into one chip, or part or the whole of the functions may be incorporated into one chip. Here, the chip is referred to as the LSI, however, it may be called IC, system LSI, super LSI, ultra LSI depending on the degree of integration.

In addition, the method of forming an integrated circuit is not limited to LSI, and it may be implemented by a dedicated circuit or a general-purpose processor. It is also allowable to utilize a Field Programmable Gate Array (FPGA) that is programmable after fabrication of the LSI or utilize a reconfigurable processor that is reconfigurable in connections and settings of circuit cells inside the LSI.

Furthermore, with the future advent of an integrated circuit technology that would replace the LSI brought by advances in semiconductor technologies or other derivative technologies, it would be of course possible to implement functional block integration using the new technology. Application of biotechnology, etc. may be conceivable. The above embodiments may be combined with each other.

INDUSTRIAL APPLICABILITY

The present disclosure is useful for an intercom system installed in an apartment building.

REFERENCE SIGNS LIST

1 Apartment building
2 Control room
3 Lobby
4 Room
5 Entrance
11 Server
12 Telephone
13 Lobby intercom
14 Camera
15a, 15b Indoor monitor
16a, 16b Mobile terminal
17 Entrance intercom
21, 31, 41, 51, 61 Controller
22, 32, 42, 52, 62 Storage section
23, 33, 43, 53, 63 Communicator
34, 44, 54, 64 Voice processor
35, 45, 57, 67 Operator
46, 55, 65 Image processor
56, 66 Display
21a, 71b Call controller
21b Push notifier
61a, 101a Push notification receiver
61b Telephone connector
61c Camera connector
71a Extension number receiver
81a, 83d Connector
81b Registration information acquirer
81c Registration information display section
82a Registration information transmitter
82b Push ID receiver
82c Push notifier
82d Camera information transmitter
83a Registration information receiver
83b Push ID acquirer
83c Push ID transmitter
101b Information acquirer
101c Display section

The invention claimed is:

1. A mobile terminal configured to communicate with a server, wherein the server performs call control between an intercom disposed in a lobby of a building and an indoor monitor disposed in a room of the building, the mobile terminal comprising:
   a receiver which, in operation, receives event information from the server, wherein the event information includes information about one or more visits to the lobby and respective time stamps of the visits;
   a display which, in response to receiving the event information, scroll-displays the event information in chronological order; and
   a transmitter which, in response to receiving the event information, transmits a response to the server, wherein the response indicates that the response is from the mobile terminal;
   wherein the receiver, in response to the transmitter transmitting the response to the server, receives, via the server, image information captured by the intercom and formatted in an image setting selected to be compatible for display on the display of the mobile terminal.

2. The mobile terminal according to claim 1, wherein the event information includes: incoming call information from the intercom to the mobile terminal; and an image captured by the intercom.

3. The mobile terminal according to claim 1, wherein the event information includes alarm information received by the indoor monitor from an alarm apparatus.

4. The mobile terminal according to claim 1, wherein the event information includes text information input into a terminal connected to the server.

5. The mobile terminal according to claim 1, wherein the image information captured by the intercom is video information, which is formatted in a video setting selected to be compatible for display on the display of the mobile terminal.

6. The mobile terminal according to claim 5, wherein the video setting is a Real-time Transport Protocol (RTP).

7. The mobile terminal according to claim 6, wherein the receiver, in operation, receive audio information captured by the intercom and formatted in the RTP for audible output from the mobile terminal.

8. The mobile terminal according to claim 5, wherein the video setting includes a video codec setting.

9. An event information display method for a mobile terminal configured to communicate with a server, wherein the server performs call control between an intercom disposed in a lobby of a building and an indoor monitor disposed in a room of the building, the event information display method comprising:

the mobile terminal receiving event information from the server, wherein the event information includes information about one or more visits to the lobby and respective time stamps of the visits;

the mobile terminal, in response to receiving the event information, scroll-displaying the event information in chronological order;

the mobile terminal, in response to receiving the event information, transmitting a response to the server, wherein the response indicates that the response is from the mobile terminal; and the mobile terminal, in response to transmitting the response to the server, receiving, via the server, image information captured by the intercom and formatted in an image setting selected to be compatible for display on the mobile terminal.

10. The method according to claim 9, wherein the image information captured by the intercom is video information, which is formatted in a video setting selected to be compatible for display on the mobile terminal.

11. The method according to claim 10, wherein the video setting is a Real-time Transport Protocol (RTP).

12. The method according to claim 11, comprising receiving audio information captured by the intercom and formatted in the RTP for audible output from the mobile terminal.

13. The method according to claim 10, wherein the video setting includes a video codec setting.

14. A non-transitory computer-readable recording medium storing an event information display program for a mobile terminal configured to communicate with a server, wherein the server performs call control between an intercom disposed in a lobby of a building and an indoor monitor disposed in a room of the building, the program, when loaded to the mobile terminal, causes the mobile terminal to execute processing comprising:

receiving event information from the server, wherein the event information includes information about one or more visits to the lobby and respective time stamps of the visits;

in response to receiving the event information, scroll-displaying the event information in chronological order on a display of the mobile terminal;

in response to receiving the event information, transmitting a response to the server, wherein the response indicates that the response is from the mobile terminal; and in response to transmitting the response to the server, receiving, via the server, image information captured by the intercom and formatted in an image setting selected to be compatible for display on the display of the mobile terminal.

15. The medium according to claim 14, wherein the image information captured by the intercom is video information, which is formatted in a video setting selected to be compatible for display on the display of the mobile terminal.

16. The medium according to claim 15, wherein the video setting is a Real-time Transport Protocol (RTP).

17. The medium according to claim 15, wherein the video setting includes a video codec setting.

18. An intercom system, comprising:

an intercom disposed in a lobby of a building;

an indoor monitor disposed in a room of the building;

a server that performs call control between the intercom and the indoor monitor; and a mobile terminal configured to communicate with the server, wherein the mobile terminal includes:

a receiver which, in operation, receives event information from the server, wherein the event information includes information about one or more visits to the lobby and respective time stamps of the visits;

a display which, in response to receiving the event information, scroll-displays the event information in chronological order; and a transmitter which, in response to receiving the event information, transmits a response to the server, wherein the response indicates that the response is from the mobile terminal:

wherein the receiver, in response to the transmitter transmitting the response to the server, receives, via the server, image information captured by the intercom and formatted in an image setting selected to be compatible for display on the display of the mobile terminal.

19. The system according to claim 18, wherein the image information captured by the intercom is video information, which is formatted in a video setting selected to be compatible for display on the display of the mobile terminal.

20. The system according to claim 19, wherein the video setting is a Real-time Transport Protocol (RTP).

* * * * *